(12) United States Patent
Kyrlidis et al.

(10) Patent No.: US 9,238,736 B2
(45) Date of Patent: Jan. 19, 2016

(54) SURFACE MODIFIED ORGANIC BLACK PIGMENTS, SURFACE MODIFIED CARBON BLACKS, PIGMENT MIXTURES USING THEM, AND LOW DIELECTRIC BLACK DISPERSIONS, COATINGS, FILMS, BLACK MATRICES, AND DEVICES CONTAINING SAME

(75) Inventors: Agathagelos Kyrlidis, Cambridge, MA (US); Alexander I. Shakhnovich, Arlington, MA (US); Qingling Zhang, Billerica, MA (US); Joseph B. Carroll, Glen Allen, VA (US)

(73) Assignee: Cabot Corporation, Boston, MA (US)

( * ) Notice: Subject to any disclaimer, the term of this patent is extended or adjusted under 35 U.S.C. 154(b) by 560 days.

(21) Appl. No.: 13/271,452

(22) Filed: Oct. 12, 2011

(65) Prior Publication Data

US 2012/0092598 A1 Apr. 19, 2012

Related U.S. Application Data

(60) Provisional application No. 61/393,398, filed on Oct. 15, 2010.

(51) Int. Cl.
*C09C 1/56* (2006.01)
*B82Y 30/00* (2011.01)
(Continued)

(52) U.S. Cl.
CPC . *C09C 1/56* (2013.01); *B82Y 30/00* (2013.01); *C09B 68/24* (2013.01); *C09B 68/41* (2013.01); *C09B 68/463* (2013.01); *C09D 7/007* (2013.01);
(Continued)

(58) Field of Classification Search
None
See application file for complete search history.

(56) References Cited

U.S. PATENT DOCUMENTS 4,754,056 A * 6/1988 Ansel et al. .................. 560/171
5,554,739 A 9/1996 Belmont
(Continued)

FOREIGN PATENT DOCUMENTS

EP 1333068 A1 8/2003
EP 2182396 A1 5/2010
(Continued)

OTHER PUBLICATIONS

International Search Report and Written Opinion issued in corresponding International Patent Application No. PCT/US2011/055919, dated Dec. 30, 2011 (9 pages).
(Continued)

*Primary Examiner* — Gwendolyn Blackwell
*Assistant Examiner* — Anthony J Frost

(57) ABSTRACT

The present invention relates to surface modified organic black pigments, surface modified carbon blacks, pigment mixtures and dispersions formed with these pigments, curable compositions, black matrices, and products incorporating them. The surface modified organic black pigment can have attached at least one organic group having the formula -X-Z, wherein X, which is directly attached to the pigment, represents an arylene group, a heteroarylene group, an alkylene group, an aralkylene group, or an alkarylene group, and Z represents at least one ionic group, at least one ionizable group, at least one nonionic group, at least one polymeric group, or any combinations thereof. Also disclosed are carbon black pigment combinations with the surface modified organic black pigments, low dielectric black dispersions, films, and black matrices containing them. Methods of preparing and making these various materials also are provided.

14 Claims, 4 Drawing Sheets

(51) Int. Cl.
  *C09D 7/00* (2006.01)
  *C09D 17/00* (2006.01)
  *C09B 67/00* (2006.01)
  *C08K 9/04* (2006.01)

(52) U.S. Cl.
  CPC ............ *C09D 17/002* (2013.01); *C09D 17/003* (2013.01); *C01P 2004/64* (2013.01); *C01P 2006/12* (2013.01); *C01P 2006/19* (2013.01); *C01P 2006/22* (2013.01); *C01P 2006/40* (2013.01); *C01P 2006/60* (2013.01); *C08K 9/04* (2013.01)

(56) References Cited

U.S. PATENT DOCUMENTS

| | | | |
|---|---|---|---|
| 5,698,016 | A | 12/1997 | Adams et al. |
| 5,707,432 | A | 1/1998 | Adams et al. |
| 5,713,988 | A | 2/1998 | Belmont et al. |
| 5,830,930 | A | 11/1998 | Mahmud et al. |
| 5,837,045 | A | 11/1998 | Johnson et al. |
| 5,851,280 | A | 12/1998 | Belmont et al. |
| 5,885,335 | A | 3/1999 | Adams et al. |
| 5,895,522 | A | 4/1999 | Belmont et al. |
| 5,900,029 | A | 5/1999 | Belmont et al. |
| 5,922,118 | A | 7/1999 | Johnson et al. |
| 6,042,643 | A | 3/2000 | Belmont et al. |
| 6,107,350 | A | 8/2000 | Boes et al. |
| 6,336,965 | B1 * | 1/2002 | Johnson et al. ............... 106/31.6 |
| 6,337,358 | B1 | 1/2002 | Whitehouse et al. |
| 6,398,858 | B1 | 6/2002 | Yu et al. |
| 6,494,943 | B1 | 12/2002 | Yu et al. |
| 6,641,656 | B2 * | 11/2003 | Yu et al. ........................ 106/493 |
| 6,692,983 | B1 | 2/2004 | Chen et al. |
| 6,723,783 | B2 * | 4/2004 | Palumbo et al. ............... 524/555 |
| 6,942,724 | B2 | 9/2005 | Yu |
| 7,175,946 | B2 | 2/2007 | Step et al. |
| 7,416,601 | B2 * | 8/2008 | Erk et al. ...................... 106/498 |
| 7,436,462 | B2 | 10/2008 | Chang et al. |
| 7,439,090 | B2 | 10/2008 | Tung et al. |
| 7,605,192 | B2 | 10/2009 | Sanada et al. |
| 7,696,122 | B2 | 4/2010 | Ezenyilimba et al. |
| 2002/0011185 | A1 | 1/2002 | Belmont |
| 2002/0020318 | A1 | 2/2002 | Galloway et al. |
| 2003/0129529 | A1 | 7/2003 | Step et al. |
| 2004/0229975 | A1 | 11/2004 | Palumbo et al. |
| 2006/0084751 | A1 | 4/2006 | Step et al. |
| 2007/0179215 | A1 * | 8/2007 | Shakhnovich et al. ....... 523/160 |
| 2009/0095200 | A1 * | 4/2009 | Belmont et al. ............ 106/31.85 |

FOREIGN PATENT DOCUMENTS

| | | |
|---|---|---|
| JP | 61-28559 A | 2/1986 |
| JP | S61-028559 A | 2/1986 |
| JP | 10-219167 | 8/1998 |
| JP | 2003-519709 A | 6/2003 |
| JP | 2007-071994 A | 3/2007 |
| JP | 2009-069822 A | 4/2009 |
| JP | 2009075446 A * | 4/2009 |
| JP | 2009-537663 A | 10/2009 |
| JP | 2007-71994 A | 3/2014 |
| WO | 0151566 A1 | 7/2001 |
| WO | WO 01/51566 A1 | 7/2001 |
| WO | WO 02/04210 A1 | 1/2002 |
| WO | WO 02/04564 A2 | 1/2002 |
| WO | WO 03/057784 A2 | 7/2003 |
| WO | WO 2006/044676 A2 | 4/2006 |
| WO | 2007136643 A2 | 11/2007 |
| WO | WO 2007/136643 A2 | 11/2007 |

OTHER PUBLICATIONS

International Preliminary Report on Patentability issued in corresponding International Patent Application No. PCT/US2011/055919 mailed Apr. 25, 2013 (6 pages).

Office Action issued in corresponding Japanese Patent Application No. 2013-533965 (English translation), dated Jul. 25, 2014 (20 pages).

Search Report of Taiwan Application No. 100137373, date of completion of search, Dec. 29, 2014.

* cited by examiner

Pure pigment black 32 →  Pure carbon black

SURFACE MODIFIED ORGANIC BLACK PIGMENTS, SURFACE MODIFIED CARBON BLACKS, PIGMENT MIXTURES USING THEM, AND LOW DIELECTRIC BLACK DISPERSIONS, COATINGS, FILMS, BLACK MATRICES, AND DEVICES CONTAINING SAME

This application claims the benefit under 35 U.S.C. §119 (e) of prior U.S. Provisional Patent Application No. 61/393,398, filed Oct. 15, 2010, which is incorporated in its entirety by reference herein.

BACKGROUND OF THE INVENTION

1. Field of the Invention

The present invention relates to surface modified organic black pigments, surface modified carbon blacks, pigment mixtures using them, and low dielectric black dispersions, coatings, films, and black matrices containing them. The present invention also relates to color filter on arrays having these black matrices, and liquid crystal devices including these color filter on arrays. The present invention further relates to methods of preparing and making these various materials.

2. Description of the Related Art

Electric display devices convert electric information into images. Display devices, such as a liquid crystal display (LCD) device, an electrophoretic image display (EPID), and the like, display an image using optical properties, such as reflection, scattering, interference, and so forth. One conventional LCD device is a thin film transistor liquid crystal display (TFT-LCD). A conventional TFT-LCD has included a thin film transistor (TFT) array substrate, a color filter substrate, and a liquid crystal layer sandwiched therebetween. In these prior TFT-LCD devices, the conventional color filters are separated from the color filter glass (i.e., a counter electrode of thin film transistor (TFT) glass where pixels are defined). In these prior TFT-LCD configurations, alignments of color filter RGB pixels perfectly with the original and intended pixels from TFT glass can be problematic, which alignments can significantly reduce the aperture or effective pixel size, and hence can cause leakage of light and gives lower brightness. Color filter on array (COA) technology has been developed in which a COA-TFT substrate of a LCD device is provided to enhance the aperture ratio, and the resolution as well. Some developments in color filter on array technology are shown, for example, in U.S. Pat. Nos. 7,439,090 B2; 7,436,462 B2; and 6,692,983 B1.

Black matrix is a generic name for materials used in color displays to improve the contrast of an image by separating individual color pixels. Black matrixes, for example, have been patterned on a TFT array substrate of a COA-TFT structure to define regions where red, green, and blue filter layers are formed to provide a color filter on the TFT array substrate. The black matrix layer in LCDs has been manufactured by vapor deposition of Cr/CrO. Although chromium based films have excellent light-shielding capabilities, the metal vapor deposition process is expensive. In addition, chromium use and disposal is subject to increasingly restrictive environmental regulations. Chromium films also have low resistivity, which restricts the electrical design of LCDs to a subset of the possible design configurations. An ink jetting process also has been used in the manufacture of a color filter of an LCD. In one form of ink jetting process, a light-shielding layer such as a black matrix has been formed on a glass substrate component of a color filter structure, and the black matrix undergoes exposure and development processing to form a pixel area on the black matrix. Black matrix compositions also have been provided as photocurable compositions, such as photoresistive compositions.

Black pigments such as carbon black have been used in polymer compositions to make resistive black matrices. However, typical systems have not been able to provide the desired balance of overall properties. For example, while a black matrix containing a carbon black pigment could provide the required light-shielding capabilities (that is, an optical density (OD) of greater than 3 at 1 micron thickness), typically the film would have only a modest resistivity. Alternatively, if a highly resistive film were produced, the OD would typically be low.

Modified pigments having attached organic groups have also been disclosed for use in a black matrix for color filters. For example, U.S. Patent Application Publication No. 2003-0129529 A1 relates, in part, to a black matrix prepared using a pigment having attached at least one polymeric group, wherein the polymeric group comprises at least one photopolymerizable group and at least one ionic or ionizable group. Also, U.S. Patent Application Publication No. 2002-0020318 A1 relates, in part, to a black matrix prepared using a pigment having attached at least one organic ionic group and at least one amphiphilic counterion. In addition, U.S. Patent Application Publication No. 2002-0011185 A1 relates, in part, to the use of a pigment having attached at least one alkylene or alkyl group having 50-200 carbons.

However, the design of pigments for black matrices and other uses has been found by the present investigators to be an area having opportunities for advancement beyond prior understandings. The present investigators have recognized, for example, and solved at least in part, a need for materials providing black matrices and dispersions with good overall performance which can exhibit combinations of low dielectric constant, high resistivity, high optical density, and/or high IR transparency properties.

SUMMARY OF THE PRESENT INVENTION

A feature of the present invention is to provide surface modified organic black pigments.

A further feature of the present invention is to provide surface modified organic black pigments and carbon black mixtures.

Another feature of the present invention is to provide black pigment dispersions containing a liquid vehicle and surface modified organic black pigments themselves or in combinations with carbon blacks or other pigments.

An additional feature of the present invention is to provide non-aqueous black pigment dispersions containing solvent and amine-terminated polyoxyalkylene attached via an aminophenyl-(2-sulfatoethyl)-sulfone (APSES) linkage to organic black pigments, or aniline-terminated polyoxyalkylene attached directly to organic black pigments, or both, which pigments can be self-dispersing to at least some extent.

Another feature of the present invention is to provide non-aqueous black pigment dispersions containing solvent and amine-terminated polyoxyalkylene attached via an APSES linkage to carbon blacks, or aniline-terminated polyoxyalkylene attached directly to carbon black, or both, which can reduce or eliminate requirements for dispersing aids.

An additional feature of the present invention is to provide curable coatings and cured films formed with the surface modified organic black pigments alone or in combinations with carbon black.

An another feature of the present invention is to provide curable coatings and cured films formed with organic black pigments having attached at least one of an amine-terminated polyoxyalkylene via an APSES linkage and an aniline-terminated polyoxyalkylene, or a carbon black having attached at least one of an amine-terminated polyoxyalkylene via an APSES linkage and an aniline-terminated polyoxyalkylene, or combinations of both.

A further feature of the present invention is to provide black matrices formed with a curable coating containing surface modified organic black pigments, surface modified or nonmodified carbon black, or combinations of both.

Another feature of the present invention is to provide a color filter on array structure having a black matrix formed with a curable coating containing surface modified organic black pigments alone or in combinations with surface modified and/or nonmodified carbon black, on a thin film transistor array substrate.

An additional feature of the present invention is to provide a liquid crystal device having a color filter on array structure having a black matrix formed with a curable coating containing surface modified organic black pigments alone or in combinations with surface modified or nonmodified carbon black, on a thin film transistor array substrate.

Another feature of the present invention are methods of preparing and making these various materials.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a surface-modified organic black pigment having an organic black pigment having attached at least one organic group having the formula -X-Z, wherein X, which is directly attached to the pigment, represents an arylene group, a heteroarylene group, an alkylene group, an aralkylene group, or an alkarylene group, and Z represents at least one ionic group, at least one ionizable group, at least one nonionic group, at least one polymeric group, or any combinations thereof. The organic black pigment can be a perylene black, an aniline black, a cyanine black, or combinations thereof, or other organic black pigments. Enhanced attachment of organic groups to the pigments may be provided where Z is a heteroarylene group.

The present invention also relates to a method of making the indicated surface modified organic black pigment product with reacting of an organic black pigment with a diazonium salt generated from at least one aromatic-amine in a liquid reaction medium to attach at least one organic group to the surface of the pigment. The aromatic amine can be, for example, a heterocyclic-amine.

The present invention also relates to mixture of the indicated surface modified organic black pigment and surface modified and/or nonmodified carbon black.

The present invention further relates to a black pigment dispersion comprising an aqueous or non-aqueous vehicle, optional dispersant, the indicated surface modified organic black pigment, and optionally carbon black. The black pigment dispersions can contain a non-aqueous vehicle or solvent, and amine-terminated polyoxyalkylene attached via APSES linkage to organic black pigments, or, alternatively, aniline-terminated polyoxyalkylene directly attached to the organic black pigments, or both. Self-dispersing pigments may be provided, which can reduce or eliminate requirements for dispersing aids.

The present invention also relates to non-aqueous black pigment dispersions which contain a solvent and surface modified carbon black comprising an amine-terminated polyoxyalkylene attached via APSES linkage to the carbon black, or an aniline-terminated polyoxyalkylene directly attached to the carbon black, or both. These non-aqueous black pigment dispersions can reduce or eliminate requirements for dispersing aids.

The present invention further relates to curable coatings and cured films formed with these indicated surface modified organic black pigments themselves or in combinations with carbon blacks, which can comprise the indicated surface modified carbon blacks. The present invention also relates to curable coatings comprising the indicated surface modified carbon blacks but not necessarily the surface modified organic black pigments.

The present invention further relates to methods of covalently attaching polymers onto pigments selected from organic black pigments, carbon blacks, or both, where the polymers are attached to the pigments through the reaction of APSES diazonium salt-treated pigments with amine-terminated polyalkylene oxide under basic pH.

The present invention also relates to granules comprising the indicated surface modified organic black pigments and carbon blacks. The present invention also relates to a method of making the granules comprising preparing an aqueous dispersion containing a mixture of the surface modified organic black pigments and carbon black, and then drying, such as spray drying, the mixture to form the granules.

The present invention further relates to a black matrix formed by applying a curable coating composition onto a substrate to form a curable coating, curing the curable coating imagewise to form a cured coating, and developing and drying the cured coating, wherein the curable coating composition comprising a) a vehicle, b) the indicated surface-modified organic black pigments, and, optionally, c) carbon black, such as the indicated surface modified carbon blacks. The cured composition can comprise, for example, from about 20 wt % to about 60 wt % total black pigment. The total black pigment can comprise, for example, less than about 30 wt % carbon black and the remainder of the black pigment can be the indicated surface modified organic black pigment. The black matrix can have a low dielectric constant, such as less than 20, or less than 15, or less than 10. The black matrix can have a surface resistivity of greater than or equal to $10^{12}$ ohms per square, or greater than or equal to $10^{13}$ ohms per square, or greater than or equal to $10^{14}$ ohms per square, and/or have an optical density of greater than or equal to 2 at a thickness of 1 micron, or greater than or equal to 3 at a thickness of 1 micron, or greater than or equal to 4 at a thickness of 1 micron. The carbon black can be a modified carbon black product that has low structure with a DBP of from, for example, about 20 cc/100 g to about 50 cc/100 g.

The present invention further relates to a black matrix formed by applying a curable coating composition onto a substrate to form a curable coating, curing the curable coating imagewise to form a cured coating, and developing and drying the cured coating, wherein the curable coating composition comprising a) a vehicle, and b) at least one of the indicated surface-modified carbon blacks.

The present invention also relates to a color filter on array (COA) structure comprising at least one thin film transistor (TFT) array formed on a substrate, and an infrared or near-infrared radiation-transparent layer located directly on said array, wherein the radiation-transparent layer can comprise the indicated black matrix.

The present invention further relates to a liquid crystal display device comprising the indicated color filter on array structure.

It is to be understood that both the foregoing general description and the following detailed description are exemplary and explanatory only and are intended to provide a further explanation of the present invention, as claimed.

The accompanying drawings, which are incorporated in and constitute a part of this application, illustrate aspects of the present invention and together with the description, serve to explain the principles of the present invention.

DETAILED DESCRIPTION OF THE PRESENT INVENTION

Figure 1:
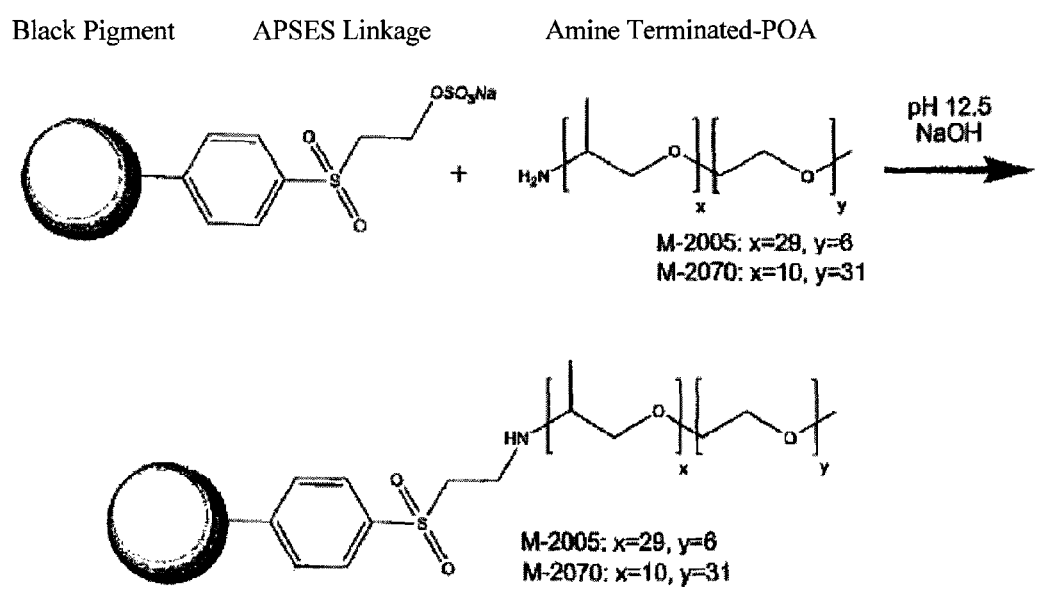
FIG. 1 is a reaction scheme for making a surface modified pigment having an amine-terminated polyoxyalkylene group attached to the pigment via an APSES linkage, according to an example of the present invention.

The present invention relates in part to surface modified organic black pigments, and carbon black pigment combinations with them, and low dielectric black dispersions, films, and black matrices containing them. The present invention also relates to color filter on arrays having these black matrices, and liquid crystal devices including these color filter on arrays. The present invention also relates to surface modified organic black pigments and carbon blacks which can have improved dispersability based on diazonium attachment of amine or aniline functionalized polyoxyalkylene or derivatives thereof to the pigment surfaces.

In some digital imaging applications (e.g., black matrix in the color filter of LCDs, toners for electrophotography, etc.), it is important for the composites or films to be both light blocking and also electrically resistive. Use of some surface derivatized carbon blacks alone can balance the light absorbing (blackness) and electrical conductivity of such composites/films. As indicated, conventional color filters are separated from the color filter glass, e.g., the counter electrode of thin film transistor (TFT) glass where pixels are defined, making it problematic to align color filter RGB pixels perfectly with the original and intended pixels from TFT glass, thereby reducing the aperture or effective pixel size. The present invention relates, in part, to unique COA materials that makes it feasible to lay a color filter of a color filter on array (COA) configuration directly onto color filter glass to address at least in part, or essentially completely, the alignment issue between TFT pixels and color filter RGB pixels. It is estimated that the effective aperture sizes may be increased up to 50% with such a COA approach and that the power consumption can be reduced. In addition, the manufacturing cost is expected to be lower as well. Another requirement of black matrix for such a COA application can be a need for a lower dielectric constant of the black matrix layer to avoid stray capacitance since the black matrix layer can be in direct contact with TFT arrays. In semiconductor manufacturing, a low-κ dielectric is a material with a small dielectric constant relative to silicon dioxide. The dielectric constant of $SiO_2$, an insulating material commonly used in silicon chips, can be about 3.9. Carbon black itself typically has a significantly higher dielectric constant than silica. Some raw organic black pigments have considerably lower dielectric constant than carbon black. However, the optical density (OD) requirement of the indicated COA devices, although possibly relatively low (e.g., an optical density of greater than or equal to 2 at a 1 micron thickness may be acceptable), may not be met by raw organic black pigments alone. Further, it can be difficult to make stable or processable dispersions of raw organic black pigments (e.g., perylene black) in some solvents convenient for use in black matrix preparations, such as, for example, propylene glycol methyl ether acetate (PGMEA) and other dispersants (e.g., polyamine based dispersants or carboxylic acid dispersants).

A discovery of the present invention, at least in part, is that a surface modification of organic black pigments (e.g., perylene blacks, aniline blacks), such as by diazonium chemistry or other attachment techniques, has been found to improve the interaction between surfaces of organic black pigments (e.g., perylene blacks) and such dispersants and provide stable dispersions of organic black pigments (e.g., perylene blacks) in such dispersions. Surface modified organic black pigments of the present invention can have low dielectric constants, such as comparable to those of the polymer matrices in which they can be dispersed, and consequently, by surface modifying these organic black pigments with appropriate functional groups that are more compatible with these matrices, significantly better color properties (image density for toners, or optical density for black matrix) can be obtained. If the blackness or color is not appropriate with the modified organic black pigments alone, it has been found that the surface modified organic black pigment can be partially replaced with carbon blacks, such as low structure carbon blacks that have a high percolation threshold and can contribute to the blackness (i.e., optical density) of the toner or black matrix film without deteriorating the films' electrical resistivity or dielectric constant. Black matrices containing these pigment products can have optical density or greater than or equal to 2 at a one micron thickness, or greater than or equal to 3 at a one micron thickness, or greater than or equal to 4 at one micron thickness. Films having an optical density of about 3 at one micron thickness which are formulated with black pigments of the present invention can have, for example, a dielectric constant of from about 4 to about 6 for surface modified organic blacks, whereas films formulated at a similar pigment loading level with regular carbon black alone may have a dielectric constant of from 30-300, or a dielectric constant of 20-25 using a low OAN carbon black, or a dielectric constant of 10-20 using diazonium modified carbon black, or a dielectric constant of 5-15 using polymer modified carbon black. Films having an optical density of about 2 at one micron thickness which are formulated with black pigments of the present invention, can have, for example, a dielectric constant when using diazonium modified carbon black that is less than about 90% of the dielectric constant when using unmodified carbon black; and the dielectric constant using polymer modified carbon black can be less than 80% of the dielectric constant when using unmodified carbon black; and the dielectric constant of blends of surface modified organic black pigments, such as disclosed herein, and carbon blacks can be approximately from about 25% to about 80% of the dielectric constant of unmodified carbon black, or other values, depending on loading. Black matrices containing the surface modified pigments of the present invention can have a surface resistivity greater than or equal to about $10^{12}$ Ohm/sq, or greater than or equal to about $10^{13}$ Ohm/sq, or greater than or equal to about $10^{14}$ Ohm/sq, and/or a dielectric constant k of less than 20, or less than 15, or less than 10, or other values. The black matrix can have a dielectric constant (K) at 1 MHz and optical density per micrometer of film (OD/μm) such that the $$\frac{K}{OD/um} \le 10, \frac{K}{OD/um} \le 7, \text{ or } \frac{K}{OD/um} \le 5.$$

Where a black matrix is formulated with a blend of surface modified organic black pigment and carbon black, the black matrix can have a decreased dielectric constant compared to a similar black matrix formulation prepared with a pigment that is a commercial modified carbon black. As indicated, the optical density of the black matrix formulated with the blend of surface modified organic black pigment and carbon black can be greater than optical density of the black matrix if formulated without the carbon black. Among carbon blacks, black matrix films made with diazonium modified carbon black alone as pigment typically can have lower dielectric constants than films made with unmodified carbon black and/or polymer modified carbon black as the black pigment.

In some black matrix films, acceptable balanced performance can be obtained by films where the total black colorant or black pigment has from about 30% to about 100%, or from about 50% to about 99%, or from about 70% to about 95%, surface modified organic black pigment, and from 0 to about 70%, or from about 1% to about 50%, or from about 5% to about 20%, carbon black, with all percentages by weight based on total weight black pigment. The surface modifications of these organic black pigments can give the pigments certain other desirable properties, such as improved dispersability in aqueous or organic solvent systems, improved compatibility with dispersants, improved dispersion quality in coatings, etc. These organic black pigments can be infrared (IR) transparent. While not desiring to be bound to a particular theory, it is thought that by surface modifying the organic black pigments, and perhaps blending them with carbon blacks when enhanced optical density is useful, excellent black coatings can be obtained that have reduced IR absorption. Surface modified organic black pigments, and blends of such pigments with carbon blacks, are presented herein which can fill these various needs.

Another discovery of the present invention relates to non-aqueous black pigment dispersions which contain a solvent and a self-dispersing surface modified pigment (e.g., organic black pigment, or carbon black, or both) comprising an amine-terminated polyoxyalkylene attached via APSES linkage to the pigment, or an aniline-terminated polyoxyalkylene directly attached to the pigment, or both. These non-aqueous black pigment dispersions can reduce or eliminate requirements for dispersing aids to stabilize the dispersion or other coatable composition containing the treated pigment and prevent gelling.

As indicated, the present invention relates in part to surface modified organic black pigments. The surface-modified organic black pigment product can comprise an organic black pigment having attached at least one organic group. The surface-modified organic black pigment can have attached at least one organic group having the formula -X-Z, wherein X, which is a first chemical group directly attached to the pigment, represents an arylene group, a heteroarylene group, an alkylene group, an aralkylene group, or an alkarylene group, and Z represents a second chemical group. Z can be non-polymeric or polymeric. Z can be, for example, an ionic group, at least one ionizable group, at least one nonionic group, or any combinations thereof. Z can be a polymeric. The polymeric group can be, for example, an amine-terminated polyoxyalkylene attached to a pigment surface with an aminophenyl-(2-sulfatoethyl)-sulfone (APSES) linkage or an aniline-terminated polyoxyalkylene directly attached to the pigment.

The term organic black pigment, as used herein, refers to any organic black pigment. Organic black pigments are not carbon black. Suitable classes of organic black pigments include perylene blacks, aniline blacks, cyanine blacks, and combinations thereof. A representative example of aniline black includes Pigment Black 1. Representative examples of perylene blacks include, for example, Pigment Black 31 and Pigment Black 32 (BASF perylene blacks, e.g., PALIOGEN® Black L0086). These blacks can be used as the starting material that is surface modified to provide surface derivatized organic black pigments.

The surface modified organic black pigments can be prepared using methods such that organic chemical groups are attached to the pigment (e.g., chemically attached, covalently attached). This can provide a more stable attachment of the groups onto the pigment compared to adsorbed groups, e.g., polymers, surfactants, and the like. For example, the surface modified organic black pigments can be prepared using and adapting the methods described in U.S. Pat. Nos. 5,554,739; 5,707,432; 5,837,045; 5,851,280; 5,885,335; 5,895,522; 5,900,029; 5,922,118; 6,042,643; 6,398,858; 7,175,946; U.S. Patent Application Publication Nos. 2003-0129529 A1; 2002-0020318; 2002-0011185 A1; and 2006-0084751 A1, and PCT Publication No. WO 99/23174, which are incorporated in their entireties herein by reference. These references describe, in part, the use of diazonium chemistry to attach functional groups to pigments. These processes have been adapted and used to form surface-modified organic black pigments of the present invention.

Processes disclosed in one or more of these incorporated references can be adapted to provide a reaction of at least one diazonium salt with an organic black pigment material (or carbon black), such as a raw organic black pigment that has not yet been surface modified with attachment groups. According to this invention, a diazonium salt is an organic compound having one or more diazonium groups. In some processes of the present invention, the diazonium salt may be prepared prior to reaction with the organic black pigment material or, more preferably, generated in situ using techniques such as known in the cited references. In situ generation also allows the use of unstable diazonium salts such as alkyl diazonium salts and avoids unnecessary handling or manipulation of the diazonium salt. In particularly preferred processes of this invention, both the nitrous acid and the diazonium salt can be generated in situ.

A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as for example isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$. The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt. In general, when generating a diazonium salt from a primary amine, a nitrite, and an acid, two equivalents of acid are required based on the amine. In an in situ process, the diazonium salt can be generated using one equivalent of the acid. When the primary amine contains a strong acid group, adding a separate acid may not be necessary in the processes of the invention. The acid group or groups of the primary amine can supply one or both of the needed equivalents of acid. When the primary amine contains a strong acid group, preferably zero to one equivalent of additional acid can be added to a process of the invention to generate the diazonium salt in situ. One example of such a primary amine is para-aminobenzenesulfonic acid (sulfanilic acid).

In general, diazonium salts are thermally unstable. They are typically prepared in solution at low temperatures, such as 0°-5° C., and used without isolation of the salt. Heating solutions of some diazonium salts may liberate nitrogen and form either the corresponding alcohols in acidic media or the organic free radicals in basic media. However, to accomplish the process of the invention, the diazonium salt need only be sufficiently stable to allow reaction with the organic black pigment material. Thus, the processes of the present invention can be carried out with some diazonium salts otherwise considered to be unstable and subject to decomposition. Some decomposition processes may compete with the reaction between the organic black pigment material and the diazonium salt and may reduce the total number of organic groups attached to the organic black pigment material. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes. The processes of the invention also can be accomplished by adding the reagents to form the diazonium salt in situ, to a mixture or suspension of the organic black pigment material in the reaction medium, for example, water. Thus, a mixture or suspension to be used in a process of the invention may already contain one or more reagents to generate the diazonium salt and the process of the invention accomplished by adding the remaining reagents. Reactions to form a diazonium salt are compatible with a large variety of functional groups commonly found on organic compounds. Thus, only the availability of a diazonium salt for reaction with an organic black pigment material may limit the processes of the invention. Processes of this invention also can be carried out in any reaction medium which allows the reaction between the diazonium salt and the organic black pigment material to proceed. The reaction medium can be, for example, a solvent-based system, and the solvent may be a protic solvent, an aprotic solvent, or a mixture of solvents. Other details on the diazonium chemistry can be found in one or more of the above-cited references.

Accordingly, the surface modified organic black pigments can be prepared, for example, by reacting an organic black pigment, such as perylene black, with a diazonium salt in a liquid reaction medium to attach at least one organic group (or chemical group) to the surface of the organic black pigment. The diazonium salt can contain the organic group to be attached to the pigment. A diazonium salt is an organic compound having one or more diazonium groups. Reaction media can include polar media. Reaction media can include water, any medium containing water, and any medium containing alcohol. Water can be a preferred medium. In a preparation of the surface modified organic black pigment (e.g., surface modified perylene black products), the diazonium salt need only be sufficiently stable to allow reaction with the organic black pigments. Thus, that reaction can be carried out with some diazonium salts otherwise considered to be unstable and subject to decomposition. Some decomposition processes may compete with the reaction between the organic black pigment and the diazonium salt and may reduce the total number of organic groups attached to the colored pigment. Further, the reaction may be carried out at elevated temperatures where many diazonium salts may be susceptible to decomposition. Elevated temperatures may also advantageously increase the solubility of the diazonium salt in the reaction medium and improve its handling during the process. As indicated, the diazonium salts may be prepared in situ. It can be preferred that the surface modified organic black pigments (e.g. surface modified organic black pigment products) of the present invention contain no by-products or unattached salts.

In a process of preparation, an organic black pigment, such as perylene black, can be reacted with a diazonium salt when present as a dilute, easily stirred, aqueous slurry, or in the presence of the proper amount of water for organic black pigment pellet formation. If desired, organic black pigment pellets may be formed utilizing a conventional pelletizing technology. Other colored pigments, if used, such as carbon blacks, can be similarly reacted with the diazonium salt. In addition, when surface modified organic black pigments are used with carbon black or other different colored pigments, for instance, such as in dispersions or coatings, the organic black pigments and carbon black can be ground to a fine particle size before reaction with the diazonium salt in the process to prevent unwanted precipitation or sedimentation of the surface modified organic black pigments in the dispersions or coatings. An additional means of stabilization of the particles may be necessary in dispersions or coatings when the amounts of organic groups on the organic black pigment are not sufficient to provide colloidal stability. One such means can be the use of a dispersant.

As indicated, the group X can represent an arylene or heteroarylene group, an alkylene group, an aralkylene group, or an alkarylene group. X is directly attached to the pigment and is further substituted with the Z group. X can be a linker group (e.g., a linking diradical) that preferably can be directly bonded between the pigment surface and the Z group. The arylene and heteroarylene groups can be an aromatic group including, but not limited to, unsaturated cyclic hydrocarbons containing one or more rings. For the heteroarylene groups, one or more ring carbons of the aromatic group are substituted by a hetero atom (i.e., a non-carbon atom). The hydrogens of the aromatic group can be substituted or unsubstituted. As indicated, X can represent a heteroarylene group. It has been found that using a diazonium chemistry route including heterocycle based diazonium salts to treat organic black pigment surfaces, such as perylene black surfaces, can make it easier to attach the surface modification groups. While not desiring to be bound to a particular theory, it is thought that the heterocyclic rings may be less apt to be deactivated on the pigments.

The heteroarylene group can be a linker group which comprises, for example, at least one heterocyclic ring which contains one or more heteroatoms (e.g., one, two, three, or more heteroatoms). The heterocyclic ring can contain, for example, from 3 to 12 ring member atoms, or from 5 to 9 ring members, or 5, or 6, or 7, or 8 membered rings. The heteroatoms are non-carbon atoms such as N, S, O, or others. The heterocyclic ring can include, for example, at least one carbon atom, or at least two carbon atoms, or other numbers of carbon atoms. When multiple heteroatoms are used in a heterocyclic ring, the heteroatoms can be the same or different. The heterocyclic group may contain a single heterocyclic ring or fused rings including at least one heterocyclic ring. The heteroarylene group can be, for example, imidazolylene, pyrazolylene, thiazolylene, isothiazolylene, oxazolylene, isoxazolylene, thienylene, furylene group, fluorenylene, pyranylene, pyrrolylene, pyridylene, pyrimidylene, indolylene, isoindolylene, tetrazolylene, quinolinylene, isoquinolinylene, quinazolinylene, carbazolylene, purinylene, xanthenylene, dibenzofurylene, 2H-chromenylene, or any combinations thereof. X can also represent an arylene group, such as a phenylene, naphthylene, biphenylene phenyl, anthracenylene, and the like. When X represents an alkylene group, examples include, but are not limited to, substituted or unsubstituted alkylene groups that may be branched or unbranched. For example, the alkylene group can be, for example, a C1-C12 group such as methylene, ethylene, propylene, or butylene, or other alkylenes.

The group X can be further substituted with groups other than Z, such as one or more alkyl groups or aryl groups. Also, the group X can be substituted, for example, with one or more functional groups. Examples of functional groups include, but are not limited to, R, OR, COR, COOR, OCOR, carboxylates, halogens, CN, $NR_2$, $SO_3H$, sulfonates, sulfates, NR(COR), $CONR_2$, $NO_2$, $PO_3H_2$, phosphonates, phosphates, N—NR, SOR, $NSO_2R$, wherein R, which can be the same or different, is independently hydrogen, branched or unbranched C1-C20 substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

As indicated, group Z can be at least one ionic group, ionizable group, nonionic group, or a polymeric group. The group Z can also comprise a mixture of an ionic group and an ionizable group. The ionic group can be either anionic or cationic and can be associated with a counterion of the opposite charge including counterions such as $Na^+$, $K^+$, $Li^+$, $NH_4^+$, $NR'_4^+$, acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. The ionizable group can be one that is capable of forming an ionic group in the medium of use. Anionizable groups can form anions and cationizable groups can form cations. Ionic groups include those described in U.S. Pat. Nos. 5,698,016; 5,837,045; and 5,922,118, the descriptions of which are fully incorporated herein by reference. The anionic groups are negatively charged ionic groups that may be generated from groups having ionizable substituents that can form anions (anionizable groups), such as acidic substituents. They may also be the anion in the salts of ionizable substituents. Representative examples of anionic groups include $—COO^-$, $—SO_3^-$, $—OSO_3^-$, $—HPO3^-$, $—OPO_3^{-2}$, and $—PO_3^{-2}$. The anionic group can comprise a counterion that is a monovalent metal salt such as a $Na^+$ salt, a $K^+$ salt, a $Li^+$ salt. The counterion may also be an ammonium salt, such as a $NH_4^+$ salt. Representative examples of anionizable groups include —COOH, —$SO_3H$, —$PO_3H_2$, —R'SH, —R'OH, and —$SO_2NHCOR'$, where R' represents hydrogen or an organic group such as a substituted or unsubstituted aryl and/or alkyl group. The cationic groups are positively charged ionic groups that may be generated from ionizable substituents that can form cations (cationizable groups), such as protonated amines. For example, alkyl or aryl amines may be protonated in acidic media to form ammonium groups —$NR'_2H^+$, where R' represent an organic group such as a substituted or unsubstituted aryl and/or alkyl group. Cationic groups may also be positively charged organic ionic groups. Examples include quaternary ammonium groups (—$NR'_3^+$) and quaternary phosphonium groups (—$PR'_3^+$). Here, R' represents hydrogen or an organic group such as a substituted or unsubstituted aryl and/or alkyl group. The cationic group can comprise an alkyl amine group or a salt thereof or an alkyl ammonium group.

The group Z can comprise at least one carboxylic acid group or salt thereof, at least one sulfonic acid group or salt thereof, at least one sulfate group, a least one alkyl amine group or salt thereof, or at least one alkyl ammonium group. Since it can be preferred that the group X be a heteroarylene group or an arylene group, attached organic groups having the formula -X-Z can include, but are not limited to, heteroaryl carboxylic acid groups, heteroaryl sulfonic acid groups, aryl carboxylic acid groups, aryl sulfonic acid groups, or salts thereof. For example, the attached organic group can be, for example, an imidazolyl carboxylic acid group, an imidazolyl sulfonic acid group, a pyridinyl carboxylic acid group, a pyridinyl sulfonic acid group, a benzene carboxylic acid group, a benzene dicarboxylic acid group, a benzene tricarboxylic acid group, a benzene sulfonic acid group, or salts thereof. The attached organic group may also be a substituted derivative of any of these.

The nonionic group that may be used for Z represents a group comprising at least one nonionic group, which is a group having no apparent charge. Examples of non-ionic groups include, but are not limited to, alkyl groups (such as —R"), carboxylic acid esters (such as —COOR" or —OCOR"), amides (such as —CONHR", —$CONR"_2$, —NHCOR", or —NR"COR"), alkylene oxides, glycols, alcohols, ethers (such as —OR"), ketones (such as —COR"), halogens, and nitrites. In the above formulas, R" is a branched or unbranched alkyl or alkylene group having 1-20 carbon atoms. Thus, for example, a nonionic group attached to X may be a methyl or ethyl ester of a carboxylic acid or may be a non-polymeric group comprising this ester. Since X can be, for example, a heteroarylene or arylene group, attached organic groups having the formula -X-Z where Z is nonionic can include, but are not limited to, (hetero)aryl carboxylic acid esters, (hetero)aryl carboxylic acid amides, or (hetero)aralkyl groups, wherein the ester group, amide group, and alkyl group has 1-20 carbon atoms.

Surface modified organic black pigments having these attached groups can be formed by treating an organic black pigment (e.g., perylene black) in a liquid medium with (hetero)aryl diazonium salts containing at least one acidic functional group. Examples of (hetero)aryl diazonium salts include, but are not limited to, those prepared from sulfanilic acid, 4-aminobenzoic acid (PABA), 4-amino salicylic acid, 7-amino-4-hydroxy-2-naphthalenesulfonic acid, aminophenylboronic acid, aminophenylphosphonic acid, 4-aminophthalic acid, 2-amino-1-naphthalenesulfonic acid, 5-amino-2-naphthalenesulfonic acid, and metanilic acid. The organic group can be a substituted or unsubstituted sulfophenyl group or a salt thereof; a substituted or unsubstituted (polysulfo) phenyl group or a salt thereof; a substituted or unsubstituted sulfonaphthyl group or a salt thereof; or a substituted or unsubstituted (polysulfo)naphthyl group or a salt thereof. The diazonium salt also can comprise a heteroarylene moiety with one or more ring carbons replaced with a N, O, S, or any combinations of these atoms in the same ring structure, and a ring carbon thereof having an —$N_2^+$ substituent. These diazonium salts can comprise, for example, any of the heteroarylene groups indicated for the X group. The diazonium salt can comprise, for example, a cation of formula (Ia) or (IIa):

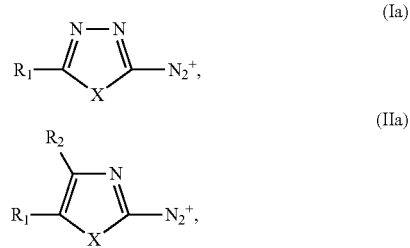

wherein X is O, N($R_a$) or S; each of $R_1$ and $R_2$, independently, is H, alkyl, alkenyl, alkynyl, cycloalkyl, cycloalkenyl, heterocycloalkyl, heterocycloalkenyl, aryl, heteroaryl, halo, cyano, $OR_b$, $COOR_b$, $OC(O)R_b$, $C(O)R_b$, $C(O)NR_bR_c$, $SO_3R_c$, $NR_bR_c$, or $N^+(R_bR_cR_d)Y$, each of $R_a$, $R_b$, $R_c$, and $R_d$, independently, being H, alkyl, cycloalkyl, heterocycloalkyl, aryl, or heteroaryl, provided that at least one of $R_1$ and $R_2$ is not H. The diazotizing reactions used to form diazonium salts comprising a heteroarylene group typically can be performed in the presence of an acid, such as sulfuric acid, phosphoric acid, acetic acid, methane sulfonic acid, or propionic acid, or mixtures thereof. Preferably, these reactions can be performed, for example, at a pH of less than about 2.5 (e.g., at a pH of less than about 2, or less than about 1.5, or less than about 1). When a heteroaryl primary amine is used to form the diazonium salt and includes an acidic group (e.g., a carboxylic acid or sulfuric acid group), the amount of an additional acid required for forming a diazonium salt can be reduced or even eliminated.

As indicated, Z can be a polymeric group(s). Polymeric groups which can be attached to the pigment include any of those disclosed in one or more of the references incorporated above. Z also can be a polyetheramine containing polymeric group. For example, a polymer modified pigment of the present invention can comprise a pigment having attached at least one polymeric group, wherein the polymeric group has the formula -X-Y-[PAO]-$R^1$. In this formula, X, which is directly attached to the pigment, can be, for example, an arylene or heteroarylene group such as defined above, and is preferably a heteroarylene group. Y can be a heteroatom-containing linking group such as N($R^2$) or O, wherein $R^2$ is H, a C1-C18 alkyl group, a C1-C18 acyl group, an aralkyl group, an alkaryl group, or an aryl group. Preferably, Y is N(H). PAO is a polyalkylene oxide group and includes polymeric groups comprising alkylene oxide groups having from about 1 to about 12 carbons, such as a —$CH_2$—$CH_2$—O— group, a —CH($CH_3$)—$CH_2$—O— group, a —$CH_2$—CH($CH_3$)—O— group, a —$CH_2CH_2CH_2$—O— group, or combinations thereof. PAO preferably can be a polyalkylene oxide copolymer which contains one or more propylene oxide (PO) units —(—CH($CH_3$)—$CH_2$—O—)$_a$— or —(—$CH_2$)—CH($CH_3$)—O—)$_a$—, and one or more ethylene oxide (EO) units —(—$CH_2$—$CH_2$—O—)$_b$—, where "a" and "b" independently each have a value equal to 1 or greater. Accordingly, PAO preferably can be a copolymer of ethylene oxide and propylene oxide units. $R^1$ can be a capping group of the polymeric group or a functional group. When $R^1$ is a capping group, it can be H, a substituted or unsubstituted alkyl group, or a substituted or unsubstituted aromatic group. When $R^1$ is a capping group and Y is NH, —Y-[PAO]-$R^1$ can be a monoamine-terminated polyalkylene oxide, which forms a polymeric group (Z) of the polymer modified pigment. $R^1$ can be selected as a capping group which is non-reactive or essentially non-reactive in any further processing and/or in end-uses of the modified pigment. $R^1$ alternatively may be a functional group (e.g., a primary amine group, —$NH_2$) such that the polyalkylene oxide can retain a reactive functional group after attachment to a pigment via group X. The amount of the polymer and modified pigment can also be varied, such as discussed in more detail above.

Z can be, for example, an amine-terminated polyoxyalkylene attached to a pigment surface with an intervening aminophenyl-2-sulfatoethyl-sulfone (APSES) linkage, such as a 4-aminophenyl-(2-sulfatoethyl)-sulfone (APSES) linkage, or a 3-aminophenyl-(2-sulfatoethyl)-sulfone (APSES) linkage, or a 5-aminophenyl-(2-sulfatoethyl)-sulfone (APSES) linkage. As used herein, the term APSES can represent any of these isomers unless specified otherwise. APSES preferably can be, for example, 4-aminophenyl-(2-sulfatoethyl)-sulfone. Z also can be, for example, an aniline-terminated polyoxyalkylene attached directly to a pigment surface. Amine-terminated polyoxyalkylene polymers can be attached to surfaces of organic black pigments through several routes. These routes include acid/base interactions, direct/covalent attachment to the pigment surface through APSES linkages or without APSES linkages, and thermal condensation with PABA functionalized pigments. Polyoxyalkylene amines which can be processed in this manner can be prepared by conventional methods and are commercially available. A commercial source of a polyoxyalkylene amines that can be processed with organic black pigments in this manner are the JEFFAMINE® series compounds, such as, but not limited to, JEFFAMINE®M2070 (available from Huntsman LLC). JEFFAMINE®M2070 is a monofunctional primary amine polyetheramine copolymer of propylene oxide/ethylene oxide having an average molecular weight of about 2,000 and a PO/EO mol ratio of 10/31. This copolymer can have a general copolymer structure, for example, of $H_3C$-(EO)$_a$—(PO)$_b$—$NH_2$, where "a" can be 6 and "b" is 35. The primary amine group of this copolymer can be used as a reaction group with the APSES to attach a derivative of the polyoxyalkylene amine to a pigment. JEFFAMINE® series materials include, but are not limited to, alkoxy-terminated JEFFAMINE® polyalkylene glycols having a weight average molecular weight ranging from about 500 to about 2500, methoxy-terminated JEFFAMINE® polyethylene glycol, methoxy-terminated JEFFAMINE® polypropylene glycol, and methoxy-terminated JEFFAMINE® polyethylene glycol/polypropylene glycol copolymer. The JEFFAMINE® compounds can contain primary amino groups attached to the terminus of a polyether backbone, also referred to as "polyether amines." As indicated, the polyether backbone is based either on propylene oxide (PO), ethylene oxide (EO), or mixed EO/PO. Such amine-terminated polyoxyalkylene compounds may be primary amines or secondary amines. For uses indicated herein, the EO/PO ratio of the JEFFAMINE® or The JEFFAMINE®-derivative compounds used can be, for example, in weight/weight ratios of from about 1/0 to about 0/1, or from 8/1 to about 1/8 (e.g., about 8 wt. parts EO/1 wt. part PO to about 1 wt. part EO/8 wt. parts PO), or from about 6/1 to about 1/6, or from about 3/1 to about 1/3, or from about 3/2 to about 2/3, or other ratios may be used.

To prepare an organic black pigment for surface modification with an amine-terminated polyoxyalkylene, the organic black pigment can be reacted, for example, with aminophenyl-(2-sulfoethyl)-sulfone through a diazonium reaction to bond an aminophenyl(2-sulfoethyl)sulfone group (APSES) to the pigment surface. Then, the aminophenyl (2-sulfoethyl) sulfone group is reacted with an amine-terminated polyoxyalkylene, such as a JEFFAMINE® series compound. This method of covalently attaching polymers onto pigments, which can be selected from the organic black pigments, carbon blacks, or both, attaches the polymers to the pigments through the reaction of aminophenyl-(2-sulfatoethyl)-sulfone (APSES) diazonium salt-treated pigments with amine-terminated polyalkylene oxide under basic pH, such a pH>10, preferably >12, and more preferably >12.5.

Referring to FIG. 1, as a non-limiting illustration, a surface modified pigment (e.g., a surface modified organic black pigment or carbon black) is provided in which an organic black pigment or carbon black has been reacted with aminophenyl-2-sulfatoethyl-sulfone (APSES), and sodium nitrite (not shown, approximately equimolar to APSES), to form a pigment having at least one attached sulfoethylsulfonate group. This pigment is further reacted as shown with an amine-terminated polyoxyalkylene amine (e.g., a JEFFAMINE®M2070 series compound) under basic conditions. The proportion of APSES to pigment used in the reaction can be, for example, from about 0.05 to about 1, or from about 0.1 to about 0.4, or about 0.25 mmoles APSES per gram of pigment. The proportion of amine-terminated polyoxyalkylene to APSES-modified pigment used in the second stage reaction can be, for example, from about 0.05 to about 3, or from about 0.1 to about 2, or about 0.5 mmoles amine-terminated polyoxyalkylene per gram of pigment.

Figure 2:
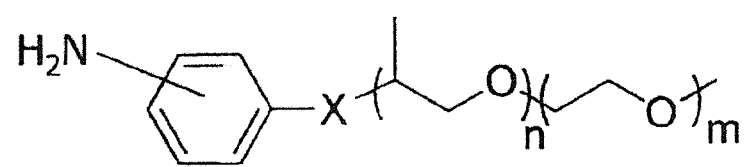
FIG. 2 shows a structure of aniline-terminated polyoxyalkylene which can be directly attached to a pigment surface in a single step diazonium reaction, according to an example of the present invention.

The present invention also relates to direct attachment of aniline-terminated polyoxyalkylenes to the pigments (e.g., organic black pigments, carbon black, or both) using diazonium chemistry. FIG. 2 shows a chemical structure of exemplary aniline-terminated polyoxyalkylenes, which can be used for the surface modification. In the structure shown in FIG. 2, x is the linkage between the aniline and the polyether moieties, wherein x can be an ester, amide, ether, or other type of bonds, and n and m are degree of polymerization. The amino group ($H_2N$—) can be attached at a para-, meta-, or ortho-position of the aryl ring relative to the position of attachment of the x linkage-containing moiety to the same ring. Aniline-terminated polyoxyalkylenes which have the amino group attached at the same ring position (e.g., para-only, or meta-only, or ortho-only), or any combinations of these indicated isomers, can be used. Using these types of aniline-terminated polyoxyalkylenes, for example, direct diazonium attachment of polymers/dispersants can be achieved through a single step reaction. The primary amine group of the aniline-terminated polyoxyalkylene can be used as a reaction group to attach a derivative of the aniline-terminated polyoxyalkylene to a pigment. These reactions also can proceed under basic conditions, such as those indicated above for the amine-terminated polyoxyalkylene reactions with APSES. The resulting functionalized pigments can exhibit excellent dispersion in a range of solvents with average particle sizes of less than, for example, 200 nm, and good stability upon heat-aging and solvent let-down testing, as well as stability during let down into resin systems. This one-step reaction strategy may reduce costs compared to some multi-stage treatment strategies used to attach polymeric systems to pigments. Accordingly, grafting of aniline-terminated polyoxyalkylenes to pigments using diazonium approaches in single step reaction is also provided in the present invention.

Another way of overcoming possible limitations of single polyoxyalkylene amine acid/base interactions with a pigment surface is increasing the number of cooperative interactions from several amine groups to the pigment. In this respect, the polymeric group can be a comb-branched copolymer comprising a hydrophobic polymeric aromatic backbone with tertiary amino groups providing multiple amine anchoring sites attachable to a pigment surface, and hydrophilic polyalkylene oxide side chains. It has been found that superior performing dispersants can contain an aromatic backbone, multiple amine anchoring sites and polyoxyalkylene amine-like PEO-PPO side-chains. Dispersant compounds having these characteristics have been found to include, for example, BYK-Chemie products series LPN 21324, LPN 21421, and LPN 21489. JEFFSPERSE® dispersants of Huntsman International LLC, such as JEFFSPERSE®X3200 JEFFSPERSE®X3500, can be used in aqueous-based dispersions and coatings with pigments of the present invention. JEFFSPERSE® dispersants are bisphenol-A epoxy based dispersants composed of a Bisphenol-A aromatic backbone with tertiary amino groups providing multiple amine anchoring sites and PEO/PPO side-chains. The JEFFSPERSE® can provide a dispersant comprising a polymer with multiple anchoring sites having affinity to treated pigment surfaces. The anchor sites on the dispersant can be selected from one of amino groups, carboxylic acid groups, phosphate groups, quaternary ammonium, urea, urethane and/or aryl groups.

The amount of organic group, such as -X-Z, attached to the organic black pigment (e.g. perylene black) can be relevant for purposes of the subsequent use of the surface modified pigment in such applications as black matrices, and other applications. For black matrix uses, the treatment levels of the organic group may be from about 0.001 to about 10.0 micromoles/$m^2$ of the organic black pigment (e.g., perylene black) used, or from about 0.5 to about 4.0 micromoles/$m^2$, or from about 1 to about 3.5 micromoles/$m^2$, or from about 1.5 to about 3.0 micromoles/$m^2$, or from about 1.75 to about 2.75 micromoles/$m^2$, based on nitrogen surface area of the organic black pigment. The amount of attached organic group may be the same or less than these treatment levels. The amount of attached organic groups having the formula -X-Z can be varied in order to attain the desired performance attributes. This allows for greater flexibility in optimizing performance properties. The total amount of attached organic groups can be, for example, from about 0.001 to about 10.0 micromoles (or higher) of organic group/$m^2$ surface area of pigment, or from about 0.01 to about 5.0 micromoles/$m^2$, or from about 0.05 to 4.0 micromoles/$m^2$, or from about 1.0 to 3.0 micromoles/$m^2$, as measured by nitrogen adsorption (BET method).

The surface modified organic black pigments can have a wide variety of primary particle sizes. For black matrix compositions, for example, the pigment may have a particle size of from about 10 nm to about 400 nm (or higher), or from about 50 nm to about 200 nm, or from about 100 nm to about 200 nm, or other particle sizes. With respect to the particle size of the black pigments herein, the particle size distribution can be based on the mean volume diameter of the pigment particles as measured by the dynamic light scattering method. The organic black pigments can have shapes such as needles, plates, ovals, or other geometries. The pigments can have other shapes, such as needles and plates. The surface modified organic black pigments can have a wide range of BET surface areas, as measured by nitrogen adsorption (ASTM D-4820), depending on the desired properties of the pigment. For example, the surface modified organic black pigments may have a surface area of from about 10 to 600 m$^2$/g or higher, such as from about 20 to 250 m$^2$/g and about 20 to 100 m$^2$/g, or other values. The organic black pigments may be subjected to conventional size reduction or comminution techniques, such as ball or jet milling, to reduce the pigment to a smaller particle size, if desired.

The present invention relates in part to surface modified organic black pigments, such as described, which do not absorb infrared (IR) radiation and therefore hardly generate heat. For example, surface modified perylene black of the present invention can assume a black color in spite of having a skeleton slightly different from that of an unmodified perylene pigment. The surface modified perylene black can be a heat shielding black pigment because it does not absorb infrared radiation. The surface modified perylene black, which does not absorb infrared radiation or at least not significantly, can therefore be superior to carbon black in heat shielding effect. However, as indicated, optical density property of surface modified perylene black or other organic black pigments according to the present invention may not be suitable or ideal for all applications, such as black matrices. Accordingly, combinations and blends of the surface modified organic black pigments with carbon black or other black colorants can be used. The carbon blacks used in such blends with the surface modified organic black pigment can be surface modified carbons, oxidized carbon blacks, unmodified carbon blacks, or combinations thereof. The proportions of carbon black or other black colorant used as a co-additive black colorant may need to be monitored to ensure any dielectric constant or other performance specifications of the pigment are complied with.

Carbon black pigments may be used as black colorant at least in part or completely for dispersions, coatings, and black matrices such as disclosed herein. Preferably, carbon black pigments, if used in black matrices, are used in combination with the surface modified organic black pigments such as disclosed herein to balance low dielectric constant and optical density considerations.

Representative examples of carbon black pigments which may be used themselves or in combination with the surface modified organic black pigments as the black colorant in dispersions, coatings, and black matrices such as disclosed herein, include, but are not limited to, the following exemplary materials. The carbon blacks can be various carbon blacks (Pigment Black 7), such as channel blacks, furnace blacks and lamp blacks, and include, for example, carbon blacks sold under the Regal®, Black Pearls®, Elftex®, Monarch®, Mogul®, and Vulcan®, trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Mogul® E, Regal® 250, Regal® 250R, Regal® 350, Regal® 350R, Regal® 330, Regal® 400, Vulcan® P, Vulcan® XC-72, Vulcan® XC-72R.

Carbon black, if used as black colorant, can be a multiphase aggregate comprising a carbon phase and a silicon-containing species phase or a multiphase aggregate comprising a carbon phase and a metal-containing species phase, such as disclosed in U.S. Patent Application Publication No. 2006/0084751 A1 and PCT Application No. WO 96/37547, which both are hereby incorporated in their entireties herein by reference. A silica-coated carbon product can also be used as the carbon black particle, such as that described in PCT Application No. WO 96/37547, which is hereby incorporated in its entirety herein by reference. The surface modified organic black pigments and carbon black pigments can also be used in combination with a variety of different types of dispersants in order to form stable dispersions.

The carbon blacks can be surface modified carbon blacks, such as described in any of U.S. Pat. Nos. 5,554,739; 5,707,432; 5,837,045; 5,851,280; 5,885,335; 5,895,522; 5,900,029; 5,922,118; 6,042,643; 6,398,858; 7,175,946; and PCT Publication No. WO 99/23174, which are incorporated in their entireties herein by reference. The carbon blacks can have attached organic groups, such as ionic groups, ionizable groups, nonionic groups, or polymeric groups. The polymer groups can be amine terminated polyoxyalkylene (e.g., APSES-JEFFAMINE®) groups with APSES linkage to the carbon black surface, or aniline-terminated polyoxyalkylene groups directly attached to the carbon black surface, or both, such as indicated above. That is, the present invention provides methods of covalently attaching polymers onto carbon blacks, where the polymers are attached to carbon blacks through the reaction of aminophenyl-(2-sulfatoethyl)-sulfone (APSES) diazonium salt-treated pigments with amine-terminated polyalkylene oxide under basic pH (e.g., pH>10, preferably >12 and more preferably >12.5), or, alternatively, via aniline-terminated polyoxyalkylene attachment directly to the surface of the carbon black as a single-step reaction.

Carbon blacks provided with APSES-linked amine-terminated polyoxyalkylene or aniline-terminated polyoxyalkylene surface modifications may be used in unique non-aqueous dispersions, curable coatings, photosensitive compositions, and can be used in low dielectric black matrices, and other products which can incorporate these carbon blacks materials and the compositions that contain them. Non-aqueous dispersions of such surface modified carbon blacks in solvent (e.g., organic vehicle) can reduce or even eliminate requirements for dispersing aids to provide a stable dispersion that is free or substantially free of gels, flocculated materials, or free-floating materials.

The carbon black, if used by itself or in combination with the surface modified organic black pigments, can have a wide range of BET surface areas, as measured by nitrogen adsorption (ASTM D-4820), depending on the desired properties of the pigment. For example, the carbon black may have a surface area of from about 10 to 600 m$^2$/g or higher, such as from about 20 to 250 m$^2$/g and about 20 to 100 m$^2$/g, or other values. For black matrix composition or similar applications, the carbon black pigment can preferably have low structure. Structure can be expressed as dibutylphthalate absorption (DBP) values, which is a measure of the structure or branching of the pigment. For example, the carbon black pigment may be a carbon black having a DBP value of from about 10 to 70 mL/100 g or higher, or from about 15 to about 50 mL/100 g, or from about 20 to about 40 mL/100 g, or other values. DBPA data can be obtained using ASTM D-2414. The pigment can have a wide variety of primary particle sizes known in the art. For example, the pigment may have a primary particle size of from about 5 nm to about 100 nm or higher, or from about 10 nm to about 80 nm, or from about 15 nm to about 50 nm, or other values. The carbon blacks may be reduced in size by conventional size reduction or comminution techniques, such as ball or jet milling, to reduce the pigment to a smaller particle size, if desired. The pigments can approach an essentially overall spherical geometry. Pigments with other shapes, such as needles and plates, may also be used.

Other types of black pigments or even pigments colored different from black pigments may be used in combination with the surface modified organic black pigments, carbon blacks, or mixtures of both, provided they are used in amounts that do not undermine a required performance property of the overall colorant pigment for its intended use. These different colored pigments may be, for example, anthraquinones, phthalocyanine blues, phthalocyanine greens, diazos, monoazos, pyranthrones, perylene reds and scarlets, heterocyclic yellows, quinacridones, and (thio)indigoids. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

The surface modified black pigments prepared by methods of the present invention may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art. The pigments may also be purified or classified to remove impurities and other undesirable free species which can co-exist in the dispersion as a result of the manufacturing process.

As indicated, the present invention relates in part to mixtures of surface modified organic black pigment and carbon blacks. A black colorant or pigment mixture (dry or dispersed), which can be used, for example, in curable coating compositions and black matrixes, for example, can combine surface modified organic black pigments and carbon black can have, for example, from about 30% to about 100%, or from about 50% to about 99%, or from about 70% to about 95%, surface modified organic black pigments, and from 0 to about 70%, or from about 1% to about 25%, or from about 5% to about 20%, carbon blacks, or other proportions, with all percentages by weight based on total weight black pigment.

Further, composite granules can be formed with aqueous dispersions containing a mixture of at least one of the surface modified organic black pigments and carbon black, and then formed into granules. The dispersions of the mixtures of different types of pigments can be formed into granules by various methods, for example, by drying and/or grinding the dried mass, freeze drying and grinding the dried mass, or spray drying the pigment dispersions to form granules. Easily dispersible composite black pigments for a variety of applications, including black matrix compositions can be prepared with these methods.

The present invention also relates to black pigment dispersions comprising, for example, liquid vehicle and the surface modified organic black pigment as the sole black pigment, or in blends with carbon black or other black pigments. The black pigment dispersions can comprise, for example, an aqueous or non-aqueous (solvent) liquid vehicle, optional dispersant, and the indicated pigment or pigments. As indicated, one aspect of the present invention is to provide self-dispersing pigments, which can reduce or eliminate requirements for dispersing aids. In this respect, for example, the present invention relates to non-aqueous black pigment dispersions comprising non-aqueous vehicle or solvent, and the organic black pigments with amine-terminated polyoxyalkylene attached via APSES, or carbon black with amine-terminated polyoxyalkylene attached via APSES, or both. A non-aqueous pigment dispersion can be provided, for example, which comprises a solvent and amine-terminated polyoxyalkylene (e.g., monoamine-terminated polypropylene oxide-ethylene oxide copolymer) attached via APSES linkage to carbon black. The present invention relates to non-aqueous black pigment dispersions comprising a non-aqueous vehicle or solvent, and the organic black pigments with aniline-terminated polyoxyalkylene directly attached to the organic black pigments, or carbon blacks with aniline-terminated polyoxyalkylene directly attached to the carbon blacks, or both. The present invention relates to non-aqueous black pigment dispersions which contain a solvent and surface modified carbon black comprising an amine-terminated polyoxyalkylene attached via APSES linkage to the carbon black, or an aniline-terminated polyoxyalkylene directly attached to the carbon black, or both. These non-aqueous black pigment dispersions can reduce or eliminate requirements for dispersing aids.

The components of the black pigment dispersions can be combined using conventional methods used for these preparations. The step of combining the components may take place, for example, in any suitable vessel, and the components may be added to the vessel either in several increments, in one single increment, or continuously. The pigments and liquid vehicle, and any other additives can be combined, for example, in equipment capable of providing high shear mixing conditions. Such equipment is known in the art and includes, for example, equipment capable of providing a grinding, impact, or similar impingement action, such as horizontal media mills, vertical media mills such as attritors, ball mills, hammer mills, pin disk mills, fluid energy mills, jet mills, fluid jet mills, impingement jet mills, rotor-stators, pelletizers, homogenizers, sonicators, cavitators, and the like. The amount of pigment in the dispersions can vary widely depending on the conditions and requirements of final use.

In formulating dispersions, the total amount of black pigment including, e.g., amounts of the surface modified organic black pigment, surface modified carbon black, or both, can be from about 5 wt % to about 90 wt %, or from about 10 wt % to about 50 wt %, or from about 20 wt % to about 30 wt %, of the total weight of the dispersion. The particle size of pigments can include the previously indicated sizes, and should allow the particles to be stable in the dispersion medium. The solvent content may vary from about 0 and about 90 wt %, or from 5 wt % to about 75 wt %, or from about 10 wt % to 50 wt %, or other values. Examples of the organic solvent include, for example, aromatic hydrocarbons, aliphatic hydrocarbons, alcohols, polyalcohols, ketones, esters, ethers, glycols, polyglycols and derivatives thereof, lactones, N-containing solvents such as amides, and any combinations of these solvents. Other solvents can include those disclosed herein for the curable coating compositions. Optional additives for the dispersions can include, for example, dispersing aids, surfactants, stabilizers, binders, humectants, biocides, drying accelerators, penetrants, and other materials. The non-aqueous pigment dispersions can be water-free or may contain small amounts of water, such as less than 5 wt % water, or less than 2.5 wt % water, or less than 1 wt % water (e.g., 0-1 wt %), or other amounts. This water content in non-aqueous dispersions may occur inadvertently, such as brought in as contaminant in intended components, and may be controlled for purposes of maintaining the stability of the non-aqueous dispersion. Additives for the dispersions include materials, such as those disclosed in U.S. Pat. Nos. 6,494,943; 5,713,988; and 6,942,724, which are incorporated in their entireties herein by reference. The total amount of the additives may be, for example, 0-50%, of the dispersion or other amounts. An aqueous medium used in the dispersions can be any medium containing water. Thus, the aqueous medium can be, for example, water or mixtures of water with water miscible solvents such as alcohols. Preferably an aqueous vehicle, if used is water. The black pigment dispersions can also be curable dispersions. For example, any curable monomer, oligomer, prepolymer or combination thereof may be used as curable compound for the dispersion. Any method of conventional radical polymerization, photo-curing system using photo acid or photo base generator, or photo induction alternating copolymerization, for example, may be employed. Furthermore, combinations of these systems also may be used.

The black pigment dispersions can be formed with a minimum of additional components (additives and/or cosolvents) and processing steps. However, additives such as surfactants and cosolvents may also be included. The black pigment dispersions prepared by the methods of the present invention may be useful in a variety of applications, including, but not limited to curable coatings, inks, plastics, paper, textiles, and rubber products.

The present invention relates also to a curable coating composition comprising the surface modified organic black pigment as the sole black pigment, the carbon black as sole black pigment, or blends of the two types of black pigments. The curable coating composition can comprise, for example, a vehicle, a curable resin, and at least one pigment selected from the surface modified organic black pigment, carbon black, or both. The vehicle may be either an aqueous vehicle or a non-aqueous vehicle. While both aqueous and non-aqueous liquid vehicles can be used, the liquid vehicle can preferably be a non-aqueous vehicle for some uses. Examples include non-aqueous vehicles comprising butyl acetate, ethylcellosolve, ethylcellosolve acetate, butylcellosolve, butylcellosolve acetate, ethylcarbitol, ethylcarbitol acetate, diethyleneglycol, cyclohexanone, propyleneglycol monomethylether, propyleneglycol monomethylether acetate, lactate esters, dimethyl formamide, methyl ethyl ketone, dimethylacetamide, and mixtures thereof. Aqueous solvents may also be added, including, for example, water and water soluble alcohols.

The curable resin may be any resin known in the art. For example, the resin may be an epoxy bisphenol-A resin or an epoxy novolac resin. The resin may also be an acrylic resin, a polyimide resin, a urethane resin, a polyester resin, or a gelatin. The resin is one that may be cured by a variety of known methods, including, for example, thermally or by any source of radiation such as, for example, infrared or ultraviolet radiation. In this way, the curable coating composition may be photosensitive (i.e. may be cured by irradiation, such as by exposure to and absorbing actinic radiation) or thermosensitive (i.e., may be cured by changing temperature, such as by heating). The resin composition may be cured by any source of radiation such as, for example, infrared or ultraviolet radiation. When the resin is curable by irradiation, the curable coating composition may further comprise a photoinitiator, which generates a radical on absorbing light with the respective pigment. Conventional photoinitiators for photosensitive resins can be used, for example, in this respect in any effective amount. Also, monomers, such as acrylates, methacrylates, epoxides, or styrenics, may be included. The curable coating composition can be formed with a minimum of additional components (additives and/or cosolvents) and processing steps. However, additives such as surfactants and cosolvents may also be included. For example, when a photosensitive resin is used, such as epoxy bisphenol-A or epoxy novolac, a photoinitiator can also be added. Monomers and/or oligomers may also be added.

The curable coating composition may be formed using any method known to those skilled in the art, including, for example, using high shear mixing. Furthermore, the compositions may be prepared using a dispersion of the surface modified organic black pigment, carbon black, or blends thereof, such as a millbase. In formulating curable coating compositions, the total amount of black pigment including, e.g., total amounts of the surface modified organic black pigment, surface modified carbon black, or both, can be from about 2 wt % to about 25 wt %, or from about 3 wt % to about 20 wt %, or from about 4 wt % to about 15 wt %, of the total weight of the curable coating composition. The total amount of black pigment can be such that, when the coating composition is used to form a curable coating and subsequently cured, the resulting cured coating comprises greater than or equal to about 10 wt % of total black pigment based on the total weight of the cured coating, or the resulting cured coating comprises greater than or equal to about 20 wt % total black pigment based on the total weight of the cured coating, or comprises from about 20 wt % to 60 wt % total black pigment based on the total weight of the cured coating. The proportions of surface modified organic black pigment and carbon black, if used, can comprise the values indicated above.

The curable coating composition can be formed with a minimum of additional components (additives and/or cosolvents) and processing steps. However, additives such as surfactants and cosolvents may also be included. For example, when a photosensitive resin is used, such as epoxy bisphenol-A or epoxy novolac, a photoinitiator can be added. Monomers and/or oligomers may be added.

The present invention further relates to a curable coating wherein the modified pigment can comprise, for example, a pigment having attached at least one organic group having the formula —X-A such as defined above. The curable resin and the pigment, e.g., the surface modified organic black pigment or carbon black, can be any of those described in more detail above. The curable coating can be a photosensitive coating, resulting in the formation of a coating by irradiating the curable coating, or a thermosensitive coating, in which a coating is formed by thermal treatment of the curable coating. For this aspect of the present invention, the curable coating can comprise a sufficient amount of surface modified organic black pigment or carbon black, or a blend thereof, such that, when cured to form a coating, the resulting coating comprises black pigment, whether it be the surface modified organic black pigment or carbon black or blend thereof, in the indicated amounts for the cured coating compositions.

The present invention further relates to a coating or coating film. The coating can be prepared from the curable coating of the present invention, which is described in more detail above. The coating can comprise a resin and at least one surface modified organic black pigment or carbon black, or blend thereof, wherein the surface modified organic black pigment, or carbon black, or both, is any of those described in more detail above. The total amount of black pigment in the coating or coating film, whether it be the surface modified organic black pigment or carbon black or blend thereof, can be present in the indicated amounts for the cured coating compositions. The proportions of surface modified organic black pigment and carbon black used can comprise the values indicated above.

It has surprisingly been found that the curable coating compositions and curable coatings of the present invention can be prepared, for example, with a predominant amount of surface modified organic black pigment alone or in combinations with carbon black in a vehicle to provide stable dispersions that can be used in coatings forming curable films. This enables the preparation of coatings and black matrices, described in more detail below, having improved overall properties and performance, including improved balance of electrical properties, such as low dielectric constant, high surface resistivity, and high optical density. Surface resistivity is a measure of the resistance to leakage current along the surface of an insulating material and can be measured using a variety of techniques known in the art including, for example, the method defined in ASTM procedure D257-93. Optical density (OD) is a measure of the opacity of a material and is typically measured using a densitometer. OD is dependent on several factors, including the thickness of the film. Optical density can be measured with an X-RITE 361T densitometer (X-RITE, Grand Rapids, Mich., U.S.A.). The surface resistivity of the coatings can be measured using a Keithley Model 6517 Electrometer/High Resistance Meter (Keithley Instruments Inc, Solon, Ohio). The coatings of the present invention can have a surface greater than or equal to about $10^{12}$ ohms per square (Ohms/sq or $\Omega$/sq), or greater than or equal to about $10^{13}$ Ohms/sq, or greater than or equal to about $10^{14}$ Ohms/sq, or other values, and/or may have an optical density of greater than or equal to about 2, or greater than or equal to about 3, or greater than or equal to about 4, or greater than or equal to about 5, at a 1 micron thickness. The coatings of the present invention may have similar electrical properties (such as resistivity) at greater film thicknesses, including, for example, 10-100 micron thickness, depending on the application of the coating. The present invention relates also to curable coating compositions, curable coatings, and coatings comprising modified organic black pigments, and black matrices that can be formed therefrom. Black matrices containing these products can have a surface resistivity and/or optical density such as indicated above. The black matrices can have a dielectric constant k of less than 20, or less than 15, or less than 10, or other values. The dielectric constant can be measured with a precision impedance analyzer (Model No. 4294A produced by Hewlett-Packard Co.). The frequencies under which the capacitance measurements are made for determining a dielectric constant can range from 100 Hz to 1 MHz.

Performance will depend on a variety of factors which may be controlled in accordance with the present invention, including treatment level and pigment type.

In general, the loading level of a specific carbon black pigment if used alone or as the predominant pigment could significantly effect the surface resistivity of a coating containing that pigment. Initially, at low loadings, the surface resistivity remains substantially constant with increasing amounts of carbon black. At higher levels, a transition occurs in which enough pigment is present that a substantial decrease in resistivity occurs. This is often referred to as the percolation threshold for carbon black. Levels of pigment in excess of this threshold have very little effect on the resistivity of the coating. In general, most carbon blacks exhibit similar percolation performance. Thus, carbon black percolation curves are very similar, regardless of the type of carbon black, with the exception that the percolation point (i.e., the loading of carbon black in which the surface resistivity decreases) is different. These effects of carbon black are shown, for example, in U.S. Patent Application Publication No. 2006/0084751 A1, which descriptions are incorporated herein by reference. By using substantial or predominant amounts of the surface modified organic black pigments such as shown herein in place of at least part of the carbon blacks as the primary means of controlling resistivity and dielectric constant properties and performance of coatings used in black matrices and other similar applications, the reliability of the coatings can be enhanced.

The present invention further relates to a black matrix which may be used in, for example, a color filter in a liquid crystal display device. The black matrix can be formed and used with any method known in the art. For example, the black matrix may be formed by applying a curable coating composition comprising black pigment, e.g., a surface modified organic black pigment and carbon black blend, onto a substrate, curing the resulting curable coating imagewise, and developing and drying the cured coating. The black matrix can be prepared from the curable coating composition, curable coating, and/or the coating of the present invention, each of which is described in more detail above.

Surface resistivity and optical density are important properties for black matrix materials, and are described in more detail above. Since the black matrices of the present invention can be formed, for example, from the curable coating compositions of the present invention, which is used to form a cured coating of the present invention, the black matrix can have the performance properties (surface resistivity and optical density) described above in relationship to the coating. In addition, the amount of the attached organic groups of the surface modified organic black pigment, or optionally also a surface modified carbon product used in blend thereof, in the black matrices of the present invention can be varied in order to attain different desired overall performance attributes. Furthermore, the amount of surface modified organic black pigment can be varied and will depend on the type of organic black pigment and the amount of attached groups. Black matrixes formulated with surface modified carbon blacks as described herein as the black pigment without co-inclusion of the surface-modified organic black pigments also may be provided. The total amount of black pigment, such as sourced from the surface modified organic black pigment, carbon black, or blends of these black pigments, in the black matrix of the present invention can be greater than or equal to about 10 wt % of total black pigment based on the total weight of the cured black matrix coating, or greater than or equal to about 20 wt % total black pigment based on the total weight of the cured black matrix coating, or comprises from about 20 wt % to about 60 wt % total black pigment based on the total weight of the cured black matrix coating. The cured black matrix can contain, for example, total black pigment having less than 30 wt % total carbon black, or other amounts thereof. These various amounts of the pigment described above for curable coating compositions can apply to formulations of the black matrix coatings, although not limited thereto. The proportions of surface modified organic black pigment and carbon black, if used, in the black matrices can comprise the values indicated above.

The present invention further relates to a color filter which can be used in combination with a black matrix and, in particular, the black matrix of the present invention. The color filter can be formed using any method known in the art and, in particular using a method similar to that for the black matrix described above. For this application, modified pigments can be used which correspond in color to the colors needed for the pixels of the display device. The present invention also relates to a color filter on array (COA) structure comprising at least one thin film transistor (TFT) array formed on a substrate, and an infrared or near-infrared radiation-transparent layer located directly on the array, wherein the radiation-transparent layer can comprise the black matrix such as indicated above. The present invention also relates to a liquid crystal display device comprising the color filter on array structure such as indicated herein.

Figure 3:
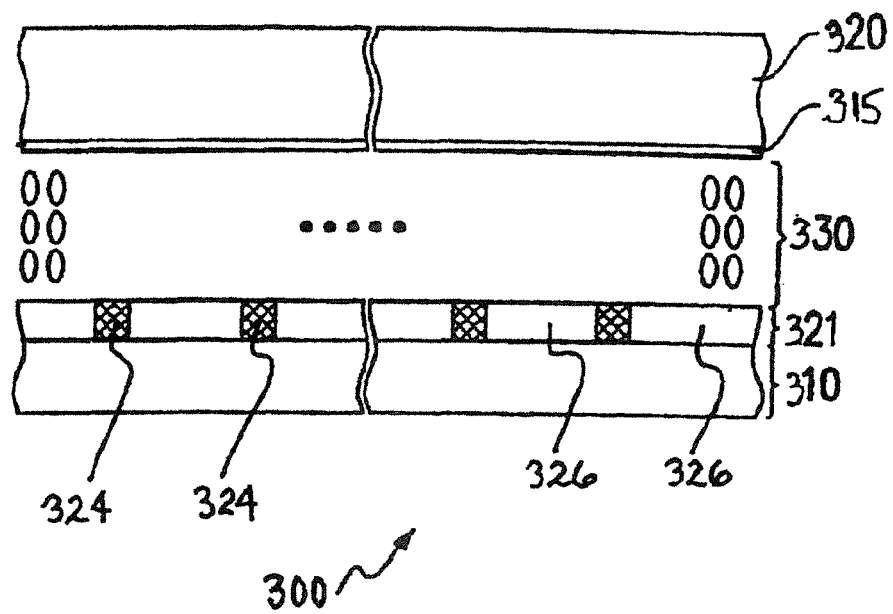
FIG. 3 is a schematic view of a liquid crystal display device including a black matrix layer, according to the present invention.

Referring to FIG. 3, for example, a liquid crystal device 300 according to the present invention is shown that can be made with a color filter on array (COA) technique. A color filter 321 is formed on an active device array substrate 310 (e.g., a TFT array substrate). The color filter 321 includes black matrix 324 and a plurality of color filter thin films 326. Generally speaking, the material of the color filter thin film regions 326 can be red, blue, or green resins. A liquid crystal layer 330 is disposed between the color filter 321 and an opposite transparent insulation substrate 320. Patterned electrodes 315 can be provided on the side of the opposite substrate 320 which faces layer 330. The color filter 321 can be formed on active device substrate 310, for example, using photolithographic methods, inkjet printing, or combinations of these techniques such as known in the art. For example, the black matrix 324 can be formed as patterned negative photosensitive back resin layer, and the color filter regions 326 can be formed as patterned photosensitive color filter layer regions and/or by ink jet printing. The design and fabrication of the active device array substrate 310 (e.g., a TFT array substrate) can be conventional or any configuration suitable for use in combination with color filters made with a black matrix composition such as disclosed herein. Other components not shown can be included in the liquid crystal device which is conventionally used in and with such devices.

The formation of a color filter including a black matrix which contains the surface modified organic black pigment and optional carbon black on a TFT array can be provided, for example, using process steps and arrangements such as disclosed and shown in U.S. Pat. Nos. 7,439,090 B2; 7,436,462 B2; and 6,692,983 B1, which are incorporated herein by reference in their entireties.

The present invention includes the following aspects/embodiments/features in any order and/or in any combination:

1. The present invention relates to a surface-modified organic black pigment comprising an organic black pigment having attached at least one organic group having the formula -X-Z, wherein X, which is directly attached to the pigment, represents an arylene group, a heteroarylene group, an alkylene group, an aralkylene group, or an alkarylene group, and Z represents at least one ionic group, at least one ionizable group, at least one nonionic group, at least one polymeric group, or any combinations thereof.
2. The pigment product of any preceding or following embodiment/feature/aspect, wherein the organic black pigment is a perylene black, an aniline black, a cyanine black, or combinations thereof.
3. The pigment product of any preceding or following embodiment/feature/aspect, wherein Z is a heteroarylene group.
4. The pigment product of any preceding or following embodiment/feature/aspect, wherein Z is a substituted or nonsubstituted imidazolylene, pyrazolylene, thiazolylene, isothiazolylene, oxazolylene, isoxazolylene, thienylene, furylene group, fluorenylene, pyranylene, pyrrolylene, pyridylene, pyrimidylene, indolylene, isoindolylene, quinolinylene, isoquinolinylene, quinazolinylene, carbazolylene, purinylene, xanthenylene, dibenzofurylene, 2H-chromenylene, or any combinations thereof.
5. A method of making the pigment product of any preceding or following embodiment/feature/aspect, comprising reacting an organic black pigment with a diazonium salt generated from at least one heterocyclic-amine in a liquid reaction medium to attach at least one organic group to the surface of the pigment.
6. A mixture of the surface modified organic black pigment of any preceding or following embodiment/feature/aspect and carbon black.
7. A pigment dispersion comprising a vehicle, an optional dispersant, and the surface modified organic black pigment of any preceding or following embodiment/feature/aspect.
8. The pigment dispersion of any preceding or following embodiment/feature/aspect, wherein the dispersant is present and comprises an amine-terminated polyoxyalkylene, optionally attached to an organic black pigment surface with an APSES linkage.
9. The pigment dispersion of any preceding or following embodiment/feature/aspect, wherein the dispersant is present and comprises an aniline-terminated polyoxyalkylene directly attached to the organic black pigments.
10. The pigment dispersion of any preceding or following embodiment/feature/aspect, wherein the dispersant is present and comprises a polymer with multiple anchoring sites having affinity to treated pigment surfaces.
11. The pigment dispersion of any preceding or following embodiment/feature/aspect, where the anchoring sites on the dispersant comprise amino groups, carboxylic acid groups, phosphate groups, quaternary ammonium, urea, urethane, or aryl groups, or any combination thereof.
12. A non-aqueous pigment dispersion comprising a solvent and aniline-terminated polyoxyalkylene directly attached to the carbon black.
13. A curable coating composition comprising a vehicle, a curable resin, and the surface modified organic black pigment of any preceding or following embodiment/feature/aspect.
14. A curable coating composition comprising a non-aqueous vehicle, a curable resin, and the surface modified carbon black of any preceding or following embodiment/feature/aspect.
15. A curable coating composition comprising a non-aqueous vehicle, a curable resin, and a surface modified carbon black comprising amine-terminated polyoxyalkylene attached via APSES linkage to carbon black.
16. The curable coating composition of any preceding or following embodiment/feature/aspect, wherein the curable resin is a photosensitive resin.
17. The curable coating composition of any preceding or following embodiment/feature/aspect, wherein the curable resin is a photosensitive resin.
18. The curable coating composition of any preceding or following embodiment/feature/aspect, wherein the curable resin is a photosensitive resin.
19. A method of covalently attaching polymers onto pigments comprising organic black pigments, comprising attaching one or more polymers to the organic black pigments through the reaction of aminophenyl-(2-sulfatoethyl)-sulfone (APSES) diazonium salt-treated pigments with amine-terminated polyalkylene oxide under basic pH.
20. Granules comprising the surface modified organic black pigment of any preceding or following embodiment/feature/aspect and a carbon black.
21. A method of making the granules of any preceding or following embodiment/feature/aspect, comprising preparing an aqueous dispersion containing a mixture of the surface modified organic black pigment of claim 1 and carbon black, and then drying the mixture to form granules.
22. A black matrix formed by applying a curable coating composition onto a substrate to form a curable coating, curing the curable coating imagewise to form a cured coating, and developing and drying the cured coating, wherein the curable coating composition comprising
   a) a vehicle,
   b) a surface-modified organic black pigment product comprising an organic black pigment having attached at least one organic group having the formula -X-Z, wherein X, which is directly attached to the pigment, represents an arylene group, a heteroarylene group, an alkylene group, an aralkylene group, or an alkarylene group, and Z represents at least one ionic group, at least one ionizable group, at least one nonionic group, at least one polymeric group, or any combinations thereof, and, optionally,
   c) carbon black.

23. The black matrix of any preceding or following embodiment/feature/aspect, wherein the black matrix has a dielectric constant (K) at 1 MHz and optical density per micrometer of film (OD/um) satisfying the following equation:

$$\frac{K}{OD/um} \leq 10$$

24. The black matrix of any preceding or following embodiment/feature/aspect, wherein the black matrix has a surface resistivity of greater than or equal to $10^{12}$ ohms per square.

25. The black matrix of any preceding or following embodiment/feature/aspect, wherein the black matrix has an optical density of about 2 at a thickness of about 1 micron.

26. The black matrix of any preceding or following embodiment/feature/aspect, wherein the cured composition comprises black pigment comprising from about 30 wt % to about 100 wt % organic black pigment and from about 0 wt % to about 70 wt % carbon black.

27. The black matrix of any preceding or following embodiment/feature/aspect, comprising surface modified carbon black having at least one of an amine-terminated polyoxyalkylene attached via APSES linkage to the carbon black and an aniline-terminated polyoxyalkylene directly attached to the carbon black.

28. The black matrix of any preceding or following embodiment/feature/aspect, wherein the carbon black has low structure with a DBP of from about 20 cc/100 g to about 50 cc/100 g.

29. The black matrix of any preceding or following embodiment/feature/aspect, wherein the black matrix has reduced IR absorption as compared to the film made with carbon black as the only black pigment.

30. A black matrix formed by applying a curable coating composition onto a substrate to form a curable coating, curing the curable coating imagewise to form a cured coating, and developing and drying the cured coating, wherein the curable coating composition comprising
   a) a vehicle,
   b) a modified carbon black having attached at least one of an amine-terminated polyoxyalkylene via an APSES linkage and an aniline-terminated polyoxyalkylene, or combinations thereof.

31. A color filter on array (COA) structure comprising:
   at least one thin film transistor (TFT) array formed on a substrate, and
   an infrared or near-infrared radiation-transparent layer located directly on said array, wherein said radiation-transparent layer comprises the black matrix of any preceding or following embodiment/feature/aspect.

32. A liquid crystal display device comprising the color filter on array structure of any preceding or following embodiment/feature/aspect.

33. The black matrix of any preceding or following embodiment/feature/aspect, wherein the black matrix has a dielectric constant (K) at 1 MHz and optical density per micrometer of film (OD/um) satisfying the following equation:

$$\frac{K}{OD/um} \leq 7$$

34. The black matrix of any preceding or following embodiment/feature/aspect, wherein the black matrix has a dielectric constant (K) at 1 MHz and optical density per micrometer of film (OD/um) satisfying the following equation:

$$\frac{K}{OD/um} \leq 5$$

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples which are intended to be only exemplary in nature.

EXAMPLES

Example 1

The surface modification of perylene blacks by diazonium chemistry and polyoxyalkylene polymer attachment to improve the interaction between perylene black surfaces and dispersants was investigated.

Figure 4:
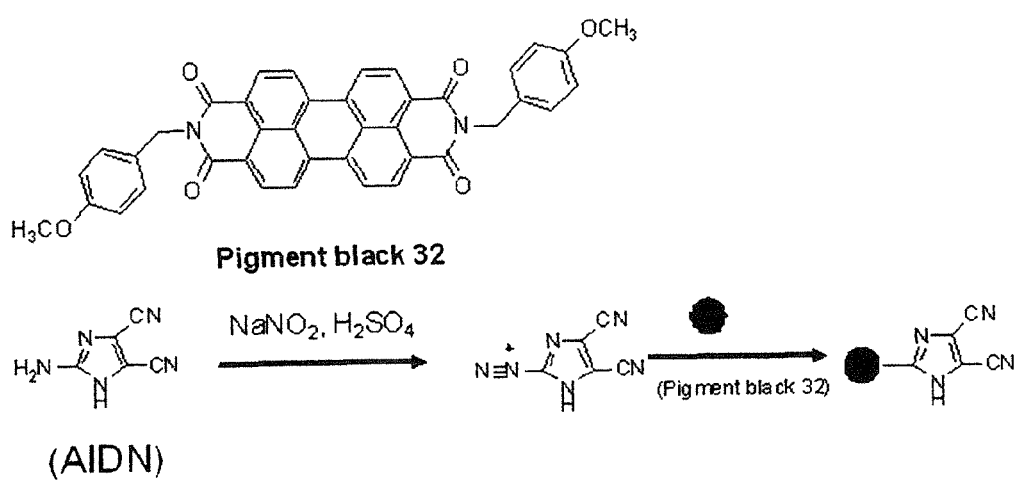
FIG. 4 is a reaction schematic for making a surface modified pigment comprising a perylene black (Pigment Black 32) treated with diazonium salt based on imidazole (i.e., 2-amino-4,5-dicyano-1H-imidazole, AIDN) to give imidazole-functionalized perylene black, according to an example of the present invention.

A 2-amino-4,5-dicyano-1H-imidazole (AIDN) treated perylene black pigment was initially prepared. The reactants and reaction scheme for this preparation are generally shown in FIG. 4. The perylene black was Pigment Black 32 (PALIOGEN® Black L0086, BASF Corporation). Pigment Black 32 (50 g) and deionized (DI) water (450 g) were first milled with glass beads (2 mm) to wet the pigment. Then, the glass beads were filtered and the aqueous dispersion was transferred into a 2 L stainless steel beaker equipped with a homogenizer and an overnight mixer. The mixture was further stirred for 2 hours with the homogenizer and overhead mixer to disperse the pigment. In a separate 250 mL 3-neck round bottom flask equipped with a magnetic stir bar, was added AIDN (6.65 g), DI water (128 mL) and 1M sulfuric acid (58.3 mL). The mixture was stirred for 20 minutes before sodium nitrite (3.45 g dissolved in 30 g DI water) was added dropwise over 15 minutes The reaction mixture was stirred for another 30 minutes after addition of sodium nitrite was complete. The formed diazonium salt solution was added in one portion into the Pigment Black 32 dispersion under vigorous mixing. The reaction mixture was heated to 70° C. and was held for 3 hours. Then, the reaction mixture was cooled to room temperature. The pH of the reaction mixture was adjusted to 8 with dilute sodium hydroxide solution. Then, the reaction mixture was filtered through a sieve (pore size 90 micrometer) and sonicated. The dispersion was diafiltered to remove salts. Finally, the pH of the aqueous dispersion was adjusted to 2 and the particles were precipitated from the solution. The precipitated dispersion was centrifuged at 4400 rpm for 10 minutes and the cake was washed two more times with DI water before it was dried at 70° C. for 16 hours. The resulting powder was referred to as AIDN-H-Pigment Black 32.

A polyoxyalkylene polymer modified AIDN-treated Pigment Black 32 in a propylene glycol methyl ether acetate (PGMEA) dispersion was prepared as follows. AIDN-H-Pigment Black 32 (10 g), JEFFAMINE® M2070 (3.5 g) (available from Huntsman Corporation), and PGMEA (36.5 g) and 2 mm glass beads (50 g) were milled in a skandex for 6 hours. The final dispersion had a particle size of 236 nm (mean volume particle size from NanoTrac) and viscosity of 5.72 cP, without gel or gel-like paste production.

As a comparative example, untreated Pigment Black 32 (10 g), JEFFAMINE® M2070 (3.5 g), and PGMEA (36.5 g) and 2 mm glass beads (50 g) were milled in a skandex for 6 hours. A gel-like paste was obtained. The viscosity was so high that it was difficult to remove it from the skandex can for meaningful viscosity measurement.

The results show that stable perylene black dispersions can be made in PGMEA from surface-modified perylene blacks according to the present invention. From these results, it is further believed that the obtained pigment dispersions with low viscosity can allow formulating in black matrix applications individually or together with carbon black dispersions to jointly adjust OD and dielectric constant properties.

As an alternative, AIDN treated Pigment Black 32 can be counter-ion exchanged with $ZnCl_2$ to give Zn instead of proton as counter-ion for the imidazolide salt. Then, a variety of dispersants which can form a complex with Zn can be used to make Pigment Black 32 dispersions in PGMEA.

Example 2

A polyoxyalkylene polymer modified APSES-treated carbon black in a propylene glycol methyl ether acetate (PGMEA) dispersion was prepared as follows. APSES treated carbon black was obtained through a diazonium reaction. In a typical procedure (for 1 mmol APSES/g pigment treatment), carbon black (100 g) was dispersed in DI water (900 g) and was vigorously dispersed with an overhead mixer and a rotor stator. After the pigment was well-dispersed in water, 4-aminophenyl-(2-sulfatoethyl)-sulfone (APSES) (28.1 g, 0.1 mol) was added to the dispersion. The temperature was brought up to 60° C. and sodium nitrite (6.9 g, 0.1 mol) in water (56 g) was added to the dispersion dropwise. After 2 hr of reaction at 60° C., the reaction was cooled to room temperature. The pH of the reaction mixture was about 6 after reaction. The mixture was purified by diafiltration.

Attachment of JEFFAMINE® M2070 directly onto the APSES treated carbon black was accomplished through Michael addition under basic pH. In a typical procedure, 50 g JEFFAMINE® M2070 was added into a stirring dispersion 500 mL purified APSES treated carbon black (total solid 50 g). Then, 20 wt % NaOH was added dropwise to adjust pH of the reaction mixture to 12.5. The mixture was stirred at room temperature overnight before it was diafiltered in water to remove excess NaOH and JEFFAMINE® M2070. After diafiltration, the JEFFAMINE® M2070 attached carbon black was dried overnight in an oven set at 70° C.

The dried carbon black with the APSES-JEFFAMINE® M2070 attachment was ground. 22 g of the fine powder was mixed with 78 g of PGMEA and sonicated for 20 minutes with a sonication horn to give a carbon black-APSES-JEFFAMINE® M2070 modified pigment dispersion in PGMEA. The particle size was approximately 109 nm and the viscosity was 2.2 cP.

Example 3

An example of directly attaching aniline-terminated PEO/PPO copolymer to a carbon black through diazonium chemistry to provide a modified carbon black useful for black matrixes is described. In a procedure (for 1 mmol polymer/g pigment treatment), carbon black (100 g) is dispersed in DI water (900 g) and is vigorously dispersed with an overhead mixed and a rotor stator. After the pigment is well-dispersed in water, an aniline-terminated polyoxyalkylene having a structure shown in FIG. 2 (200 g, 0.1 mol) and 2.5M sulfuric acid (20 mL, 0.05 mol) were added. The temperature is brought up to 60° C. and sodium nitrite (6.9 g, 0.1 mol) in water (56 g) is added to the dispersion dropwise. After 2 hr of reaction at 60° C., the reaction is cooled to room temperature. The mixture is purified by diafiltration before it is dried at 70° C. for 16 hours.

Example 4 (Prospective)

A black matrix film is prepared using a mixture of surface modified organic black pigment and modified carbon black. 20 g surface modified Pigment Black 32 dispersion (e.g., such as made in Example 1, 20 wt % in PGMEA), 20 g modified carbon black dispersion (e.g., such as made in Example 2, 22 wt % in PGMEA), 8 g photopolymer (Cyclomer ACA-200; an acrylic ester copolymer having acryloyl groups and carboxyl groups in side chains, manufactured by Daicel Chemical Industries, solid content 48 wt %, molecular weight 19,000, solid content acid value 116 mg/g), 9 g of dipentaerythritol hexaacrylate as a multifunctional monomer, 1.3 g of ethanone-1-(9-ethyl)-6-(2-methylbenzoyl-3-yl)-1-(o-acetyloxime), 1.3 g of 2,2'-bis(2-chlorophenyl)-4,4',5,5'-tetraphenyl-1,2'-biimidazole, 1.3 g of 4,4'-bis(diethylamino)benzophenone, 0.65 g of 3-methacryloxy-propyltrimethoxysilane, and 18 g of PGMEA are mixed thoroughly to prepare a photoresist. The photoresist dispersion which is prepared by the above method is spin-coated onto glass and prebaked at 100° C. for 2 minutes, thereby forming a coating film with thickness around 1.2 micrometers. Then, the substrate is cooled down to room temperature, exposed with energy of 60 $mJ/cm^2$ using a photomask under a high pressure mercury lamp. After the exposed substrate is developed with an aqueous KOH solution at room temperature, the substrate is washed with pure water, dried, and post-bake at 220° C. for 30 minutes in a convection oven to give a final patterned black matrix film.

Example 5

Polyoxyalkylene polymer modified APSES-treated perylene blacks were made similar to the modified carbon black in Example 2. Pigment Black 32-APSES-Jeffamine® M2070 was prepared and then prepared into a 20 wt % dispersion in PGMEA following the procedure of Example 2. The mean particle size was about 200 nm and the viscosity was about 3.36 cP.

Example 6

Measurement of dielectric constant and optical density of organic black pigments, mixed organic black pigments and carbon black in polymer film is described here.

20 wt % Pigment Black 32-APSES-Jeffamine® M2070 (prepared in Example 5) and 20 wt % carbon black-APSES-Jeffamine® M2070 (prepared in Example 2) was let down with a 40 wt % acrylic polymer (Neocryl B-817, obtained from DSM NeoResins, Wilmington, Mass.) solution in PGMEA to prepare a final letdown solution. The total pigment weight fraction was kept the same as the polymer weight fraction to ensure the total pigment concentration was 50 wt % in the spin-coated films. The letdown solution was spin-coated onto a glass wafer with thickness of around 1 um for optical density measurement. For the dielectric constant measurement, the letdown solution was spin-coated onto ITO coated glass to enable dielectric measurement. Gold electrodes were deposited on top of the film.

The ratio of Pigment Black 32-APSES-Jeffamine® M2070 to carbon black-APSES-Jeffamine® M2070 was varied from 1/0, 2/1, 1/1, 1/2, and 0/1 (while the total pigment concentration was maintained to be 50 wt % in the film) in the letdown solution to change the pigment ratio in the final films.

Figure 5:
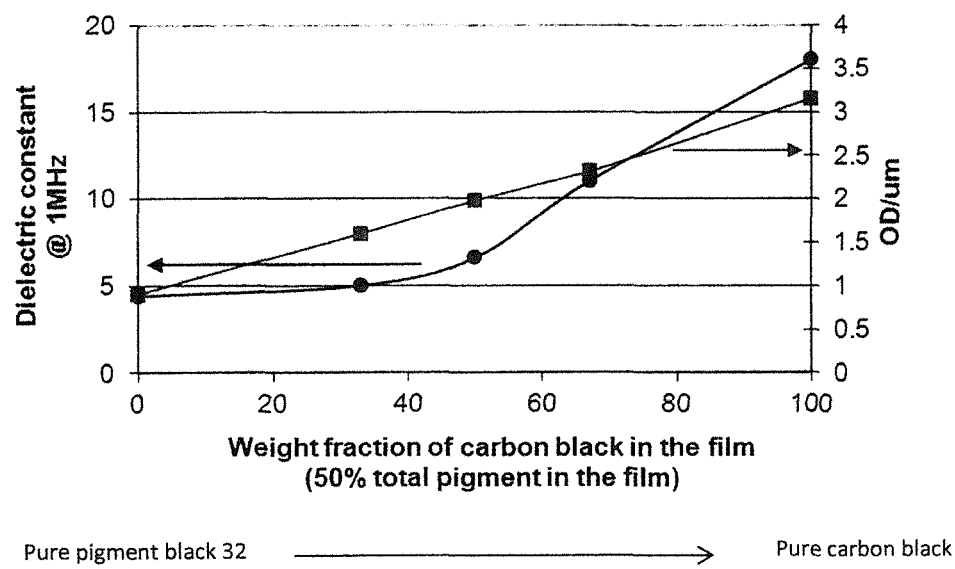
FIG. 5 is a graph plotting various weight fractions of surface modified carbon black in a film and the resulting measurements of dielectric constant and optical density.
Figure 6:
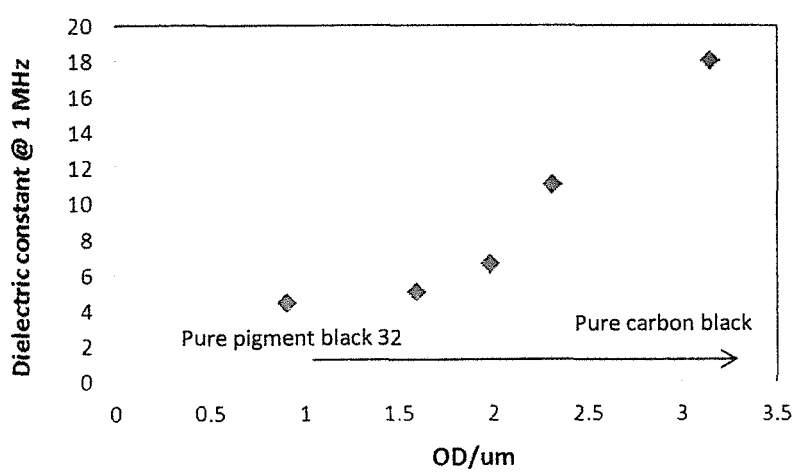
FIG. 6 is a graph showing dielectric constant versus optical density of films with different surface modified perylene black/carbon black ratios.

The dielectric constant and optical density of films with 50 wt % pigment loading in Neocryl B-817 compared to the weight fraction of carbon black in the total pigment amount is shown in FIG. 5. FIG. 6 shows dielectric constant vs. optical density of films with different Pigment Black 32/carbon black ratios.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A curable coating composition comprising a vehicle, a curable resin, and a mixture of a surface modified organic black pigment and carbon black, the surface modified organic black pigment comprising an organic black pigment having attached at least one organic group having the formula -X-Z, wherein X, which is directly chemically attached to the pigment, represents an arylene group, a heteroarylene group, an alkylene group, an aralkylene group, or an alkarylene group, and Z represents at least one ionic group, at least one ionizable group, at least one nonionic group, at least one polymeric group, or any combinations thereof.

2. The curable coating composition of claim 1, wherein X represents a heteroarylene group.

3. The curable coating composition of claim 1, wherein the organic black pigment is a perylene black, an aniline black, a cyanine black, or combinations thereof.

4. The curable coating composition of claim 1, wherein X is a substituted or nonsubstituted imidazolylene, pyrazolylene, thiazolylene, isothiazolylene, oxazolylene, isoxazolylene, thienylene, furylene group, fluorenylene, pyranylene, pyrrolylene, pyridylene, pyrimidylene, indolylene, isoindolylene, quinolinylene, isoquinolinylene, quinazolinylene, carbazolylene, purinylene, xanthenylene, dibenzofurylene, 2H-chromenylene, or any combinations thereof.

5. The curable coating composition of claim 1, wherein the surface modified organic black pigment comprises an amine-terminated polyoxyalkylene or a polyoxyalkylene chemically attached to an organic black pigment surface via a phenylsulfoethylamino group.

6. The curable coating composition of claim 1, wherein -Ph-polyoxyalkylene is directly chemically attached to the organic black pigment, wherein Ph is phenyl.

7. The curable coating composition of claim 1, wherein the surface modified organic black pigment comprises -Ph-polyoxyalkylene directly chemically attached to the organic black pigment, wherein Ph is phenyl, and the carbon black having chemically attached -Ph-polyoxyalkylene, wherein Ph is phenyl.

8. The curable coating composition of claim 1, wherein the vehicle is non-aqueous, and the carbon black comprising a surface modified carbon black comprising carbon black having chemically attached -Ph-polyoxyalkylene, wherein Ph is phenyl.

9. The curable coating composition of claim 1, wherein the vehicle is non-aqueous, and the carbon black comprising a surface modified carbon black comprising carbon black having chemically attached -PSE-polyoxyalkylene, wherein PSE is phenylsulfoethylamino.

10. The curable coating composition of claim 1, wherein the curable resin is a photosensitive irradiation-curable resin.

11. The curable coating composition of claim 8, wherein the curable resin is a photosensitive irradiation-curable resin.

12. The curable coating composition of claim 9, wherein the curable resin is a photosensitive irradiation-curable resin.

13. The curable coating composition of claim 1, comprising surface modified carbon black comprising said carbon black comprising at least one of carbon black having chemically attached -PSE-polyoxyalkylene, wherein PSE is phenylsulfoethylamino and carbon black having chemically attached -Ph-polyoxyalkylene, wherein Ph is phenyl.

14. The curable coating composition of claim 1, wherein the carbon black has low structure with a DBP of from about 20 cc/100 g to about 50 cc/100 g.

* * * * *